United States Patent
Piedmonte et al.

(10) Patent No.: US 10,676,176 B1
(45) Date of Patent: Jun. 9, 2020

(54) ADJUSTABLE CONFIGURATIONS FOR AERIAL VEHICLE SAFETY

(71) Applicant: Amazon Technologies, Inc., Seattle, WA (US)

(72) Inventors: Michael Piedmonte, Kirkland, WA (US); David Moro Ludena, Madrid (ES); Cyriel Notteboom, Cambridge (GB); Christopher Gornall, Essex (GB); James Thomas, Cambridgeshire (GB)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 15/605,589

(22) Filed: May 25, 2017

(51) Int. Cl.
| | |
|---|---|
| *B64C 9/22* | (2006.01) |
| *B64C 29/00* | (2006.01) |
| *B64C 5/02* | (2006.01) |

(52) U.S. Cl.
CPC ............... *B64C 9/22* (2013.01); *B64C 5/02* (2013.01); *B64C 29/0025* (2013.01)

(58) Field of Classification Search
CPC .... B64C 3/48; B64C 3/50; B64C 5/02; B64C 5/08; B64C 9/22; B64C 11/001; B64C 2201/021; B64C 27/22; B64C 27/26; B64C 29/0025; B64C 39/008; B64D 2033/022
See application file for complete search history.

(56) References Cited

U.S. PATENT DOCUMENTS

| | | | | |
|---|---|---|---|---|
| 2,940,688 A | * | 6/1960 | Bland | B64C 37/00 244/2 |
| 3,410,506 A | * | 11/1968 | Hayes | B64C 27/26 244/7 R |
| 4,557,441 A | | 12/1985 | Aspinall | |
| 5,666,803 A | | 9/1997 | Windisch | |
| 5,979,824 A | * | 11/1999 | Gagliano | B64C 1/26 244/13 |
| 6,082,665 A | * | 7/2000 | Spitzer | B64C 37/00 244/2 |
| 6,224,012 B1 | * | 5/2001 | Wooley | B60F 5/02 244/121 |
| 6,264,136 B1 | * | 7/2001 | Weston | B64C 3/385 244/48 |
| 8,936,212 B1 | * | 1/2015 | Fu | B64C 3/56 244/6 |

(Continued)

*Primary Examiner* — Christopher D Hutchens
(74) *Attorney, Agent, or Firm* — Athorus, PLLC

(57) ABSTRACT

An aerial vehicle may include adjustable configurations to selectively provide protection for propellers of the aerial vehicle. Portions of the wing and/or the tail plane of the aerial vehicle may be reconfigured to an extended configuration around a periphery of one or more propellers during generally vertical flight or hovering operations, when delivery a payload, and/or upon detecting objects in proximity. Likewise, the portions of the wing and/or the tail plane may be reconfigured to a retracted configuration that eliminates or minimizes adverse aerodynamic effects during generally horizontal flight operations, when operating at high altitude, and/or upon detecting no objects in proximity. During the reconfiguration, portions of the leading edge of the wing may be extended or retracted, and/or portions of the tail plane may be extended, retracted, and/or rotated.

15 Claims, 11 Drawing Sheets

(56) References Cited

U.S. PATENT DOCUMENTS

| | | | |
|---|---|---|---|
| 2003/0094536 A1* | 5/2003 | LaBiche | B60F 5/02 244/2 |
| 2004/0245374 A1* | 12/2004 | Morgan | B64C 5/02 244/12.3 |
| 2009/0166477 A1 | 7/2009 | Bousfield | |
| 2011/0036939 A1* | 2/2011 | Easter | B60F 5/02 244/2 |
| 2014/0339372 A1* | 11/2014 | Dekel | B64C 29/0033 244/7 R |
| 2015/0246726 A1 | 9/2015 | Pongratz et al. | |
| 2017/0259914 A1 | 9/2017 | Bevirt et al. | |
| 2018/0093777 A1 | 4/2018 | Cheung | |
| 2018/0178910 A1* | 6/2018 | Har | B64C 29/02 |
| 2018/0186464 A1* | 7/2018 | Woodworth | B64C 39/024 |
| 2018/0222577 A1 | 8/2018 | Goldman | |
| 2019/0120077 A1 | 4/2019 | Kempshall | |

* cited by examiner

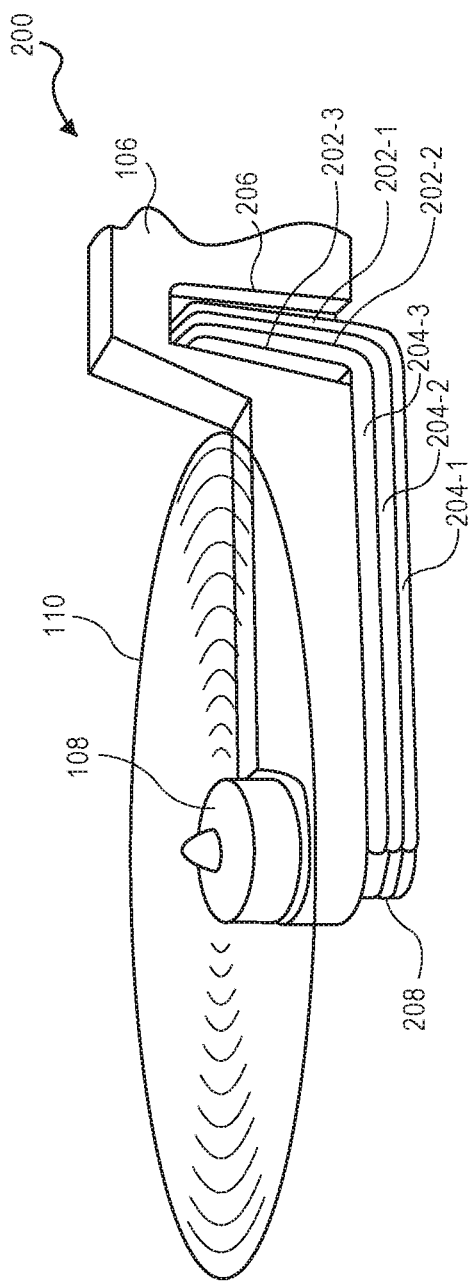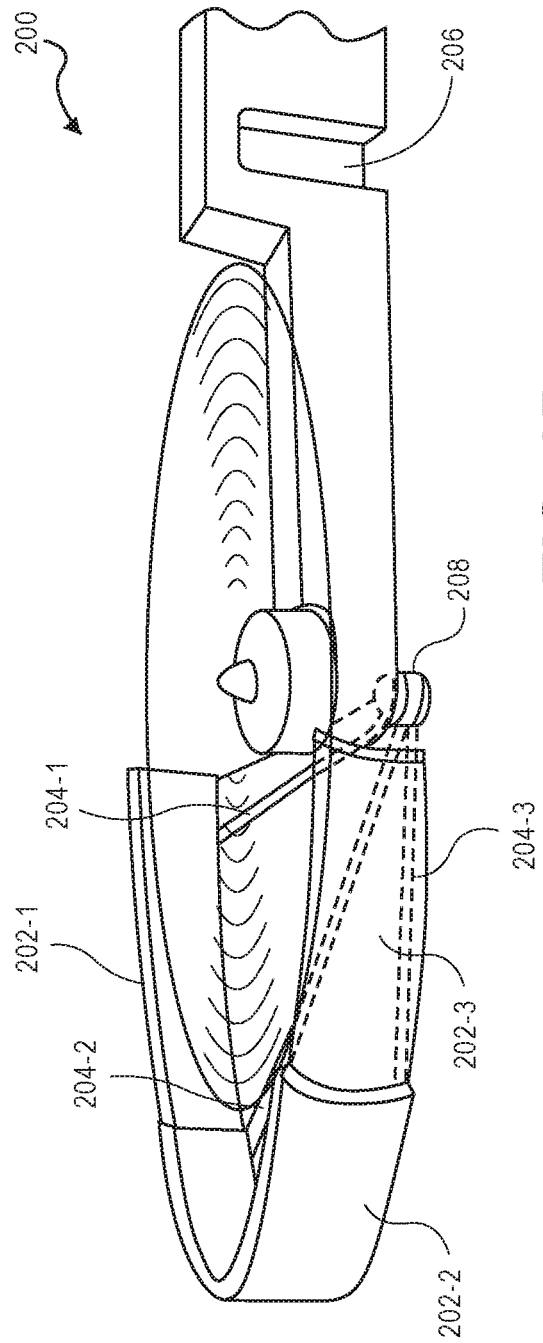
FIG. 2A
FIG. 2B

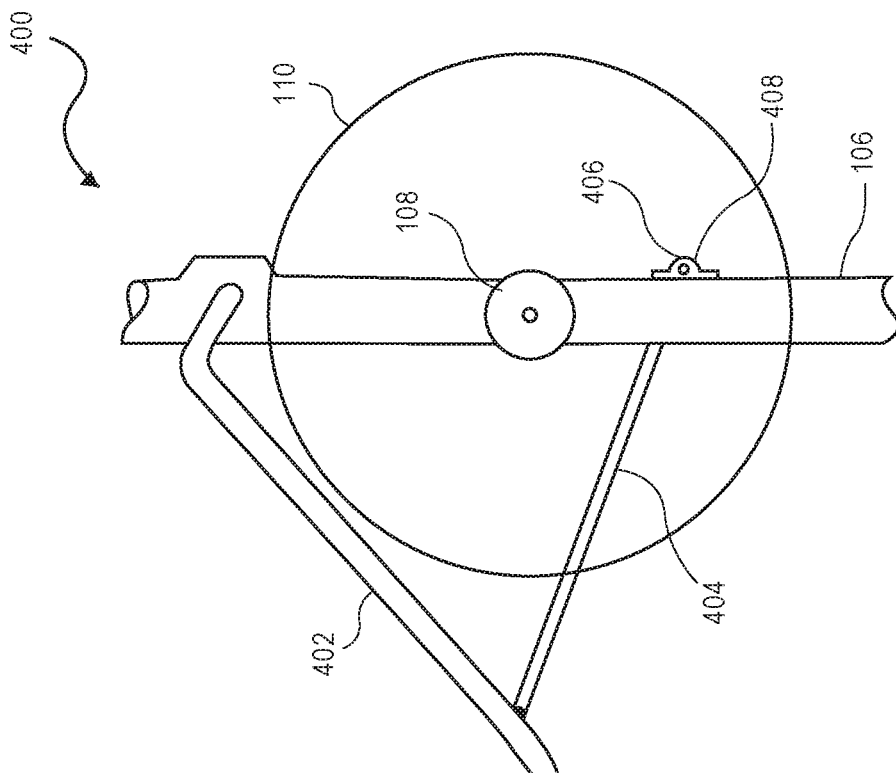
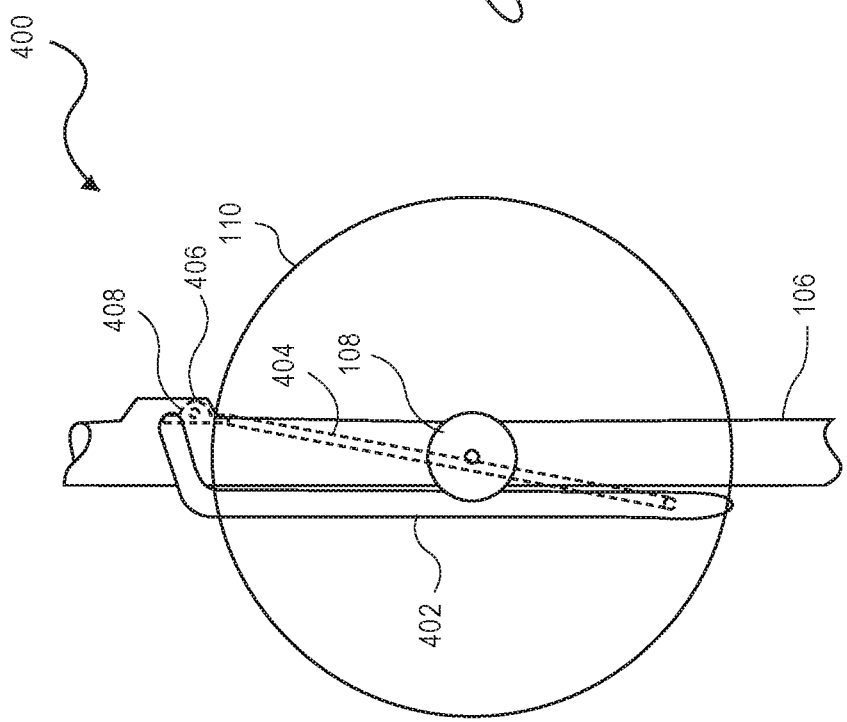

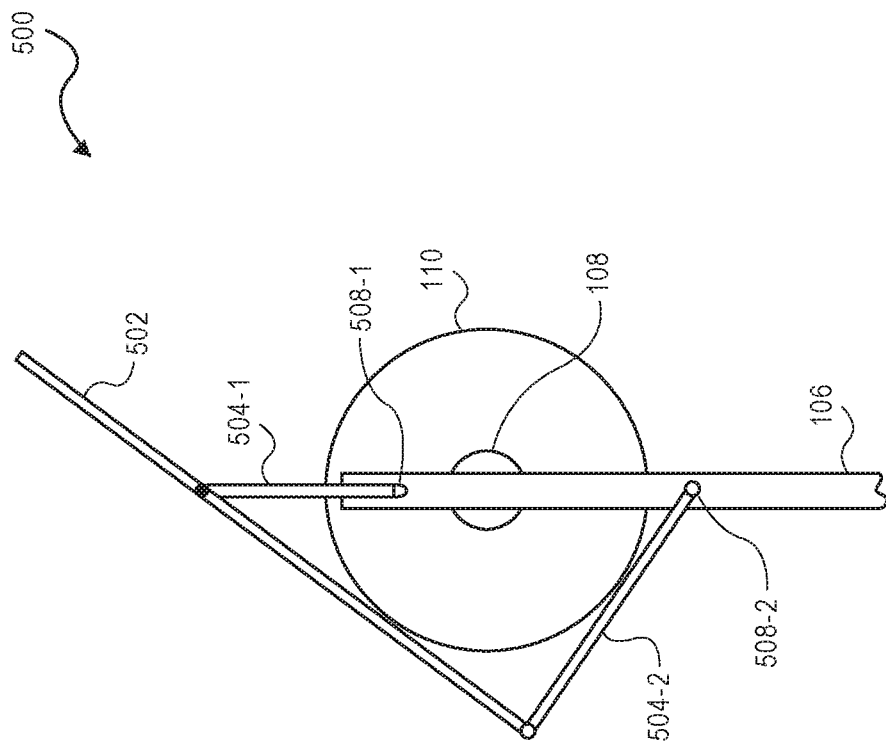
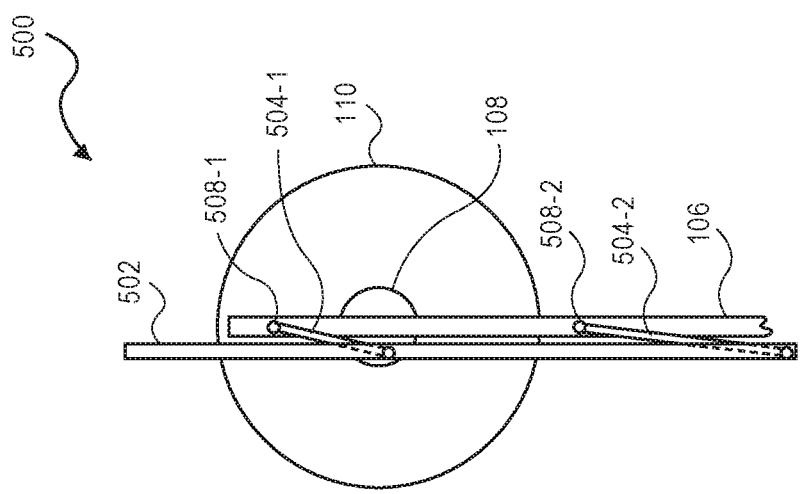
FIG. 5B
FIG. 5A

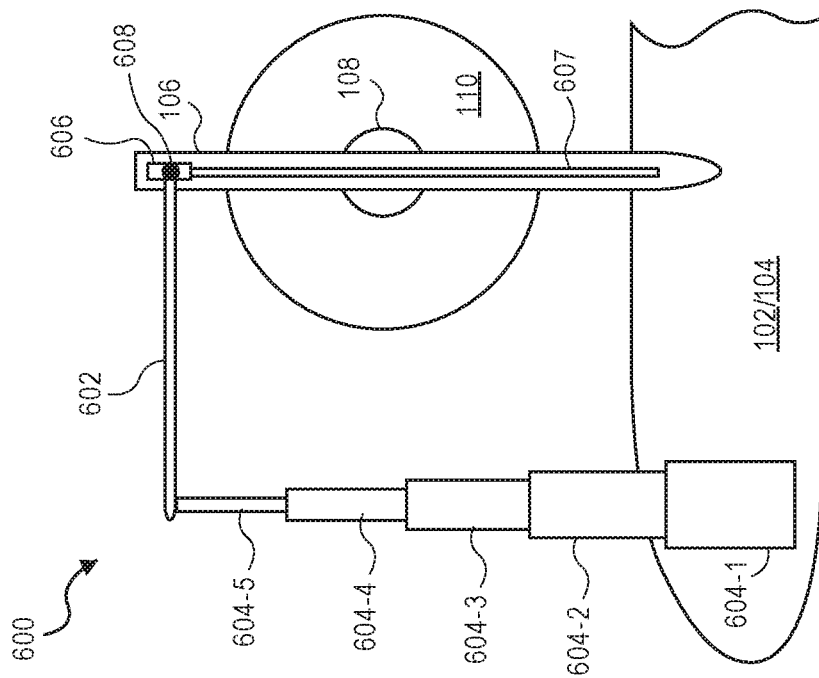
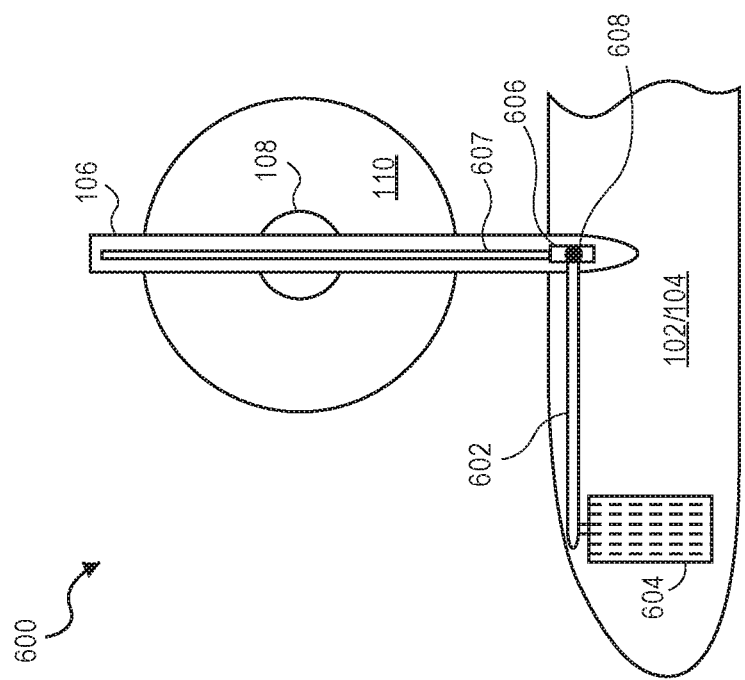

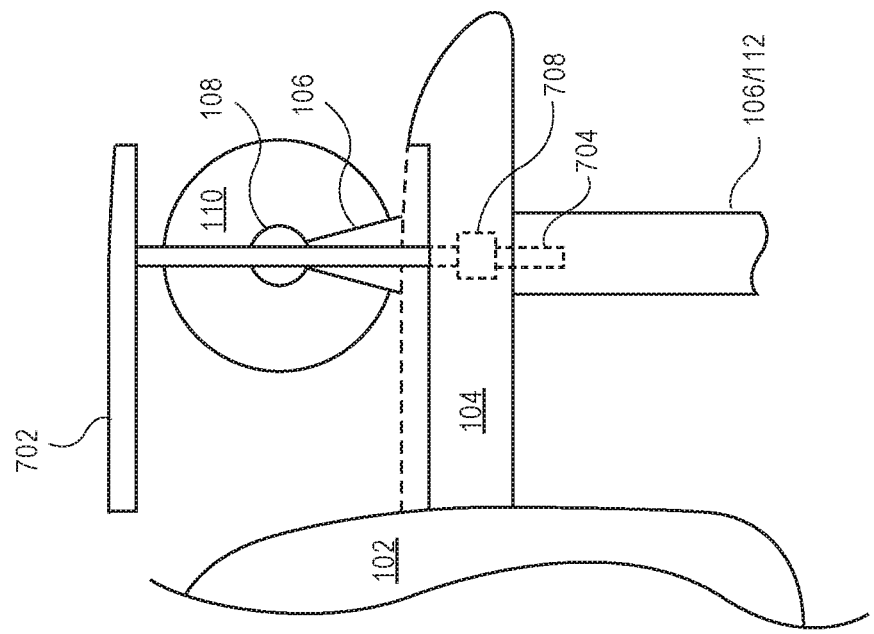
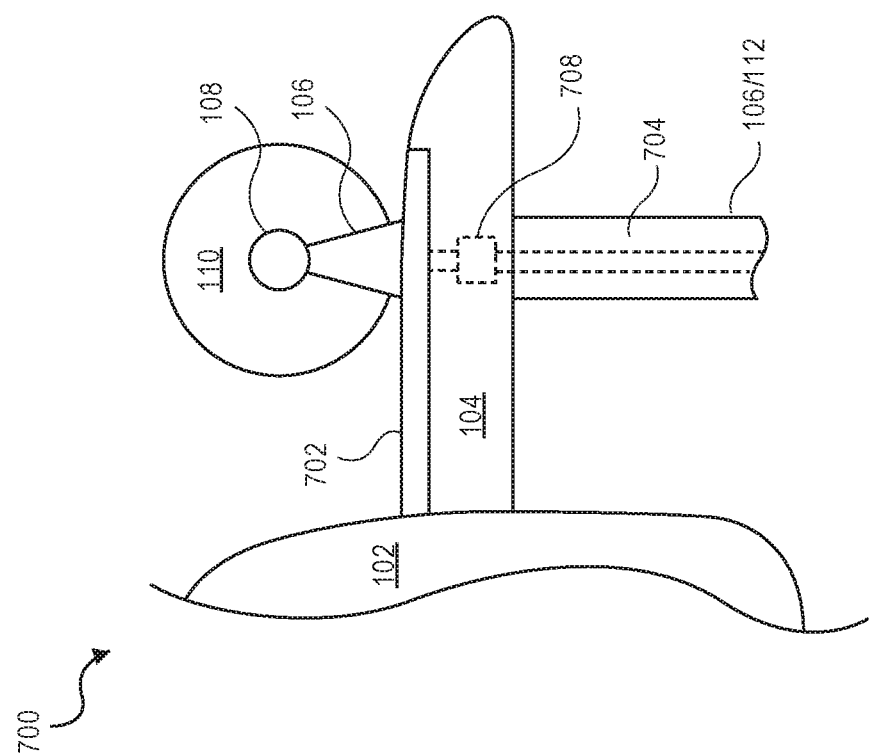

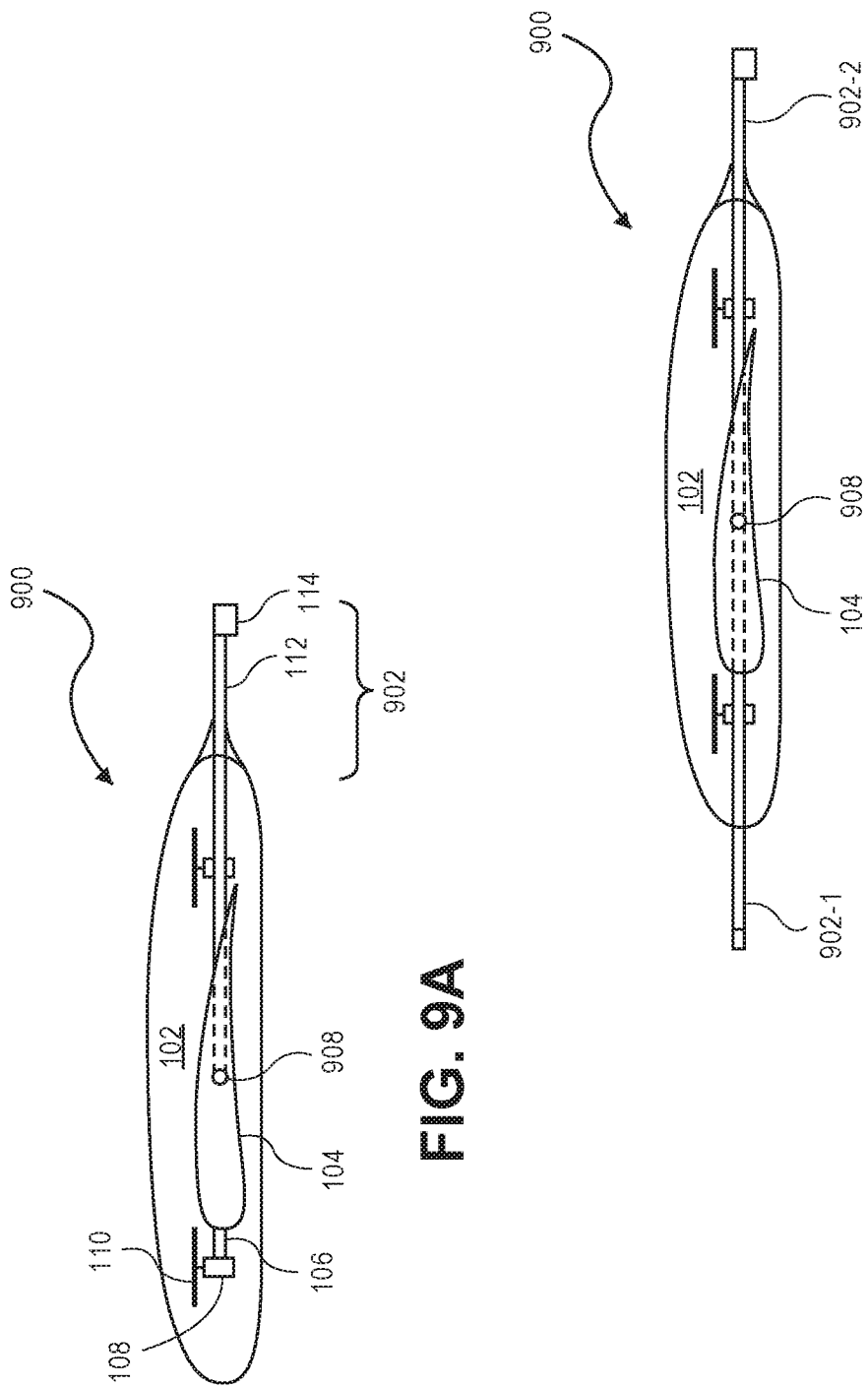

ADJUSTABLE CONFIGURATIONS FOR AERIAL VEHICLE SAFETY

BACKGROUND

Aerial vehicles may utilize propellers to provide vertical lift and/or horizontal thrust. In order to operate such aerial vehicles safely around other objects or in particular environments, a physical shroud or barrier may surround each propeller to prevent contact with the propeller. However, the physical shroud or barrier may have adverse effects on aerodynamic properties and flight characteristics of the aerial vehicles. Accordingly, there is a need for aerial vehicles that utilize propellers surrounded by physical shrouds for safety while also eliminating or minimizing adverse effects to aerial vehicle operation due to such physical shrouds.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is a schematic diagram of an adjustable fan shroud in a first configuration, according to an implementation.

FIG. 2B is a schematic diagram of the adjustable fan shroud in a second configuration, according to an implementation.

FIG. 4A is a schematic diagram of a first adjustable arm shroud in a first configuration, according to an implementation.

FIG. 4B is a schematic diagram of the first adjustable arm shroud in a second configuration, according to an implementation.

FIG. 5A is a schematic diagram of a second adjustable arm shroud in a first configuration, according to an implementation.

FIG. 5B is a schematic diagram of the second adjustable arm shroud in a second configuration, according to an implementation.

FIG. 6A is a schematic diagram of a third adjustable arm shroud in a first configuration, according to an implementation.

FIG. 6B is a schematic diagram of the third adjustable arm shroud in a second configuration, according to an implementation.

FIG. 7A is a schematic diagram of an adjustable leading edge shroud in a first configuration, according to an implementation.

FIG. 7B is a schematic diagram of the adjustable leading edge shroud in a second configuration, according to an implementation.

FIG. 9A is a schematic diagram of an adjustable tail plane shroud in a first configuration, according to an implementation.

FIG. 9B is a schematic diagram of the adjustable tail plane shroud in a second configuration, according to an implementation.

Figure 1:
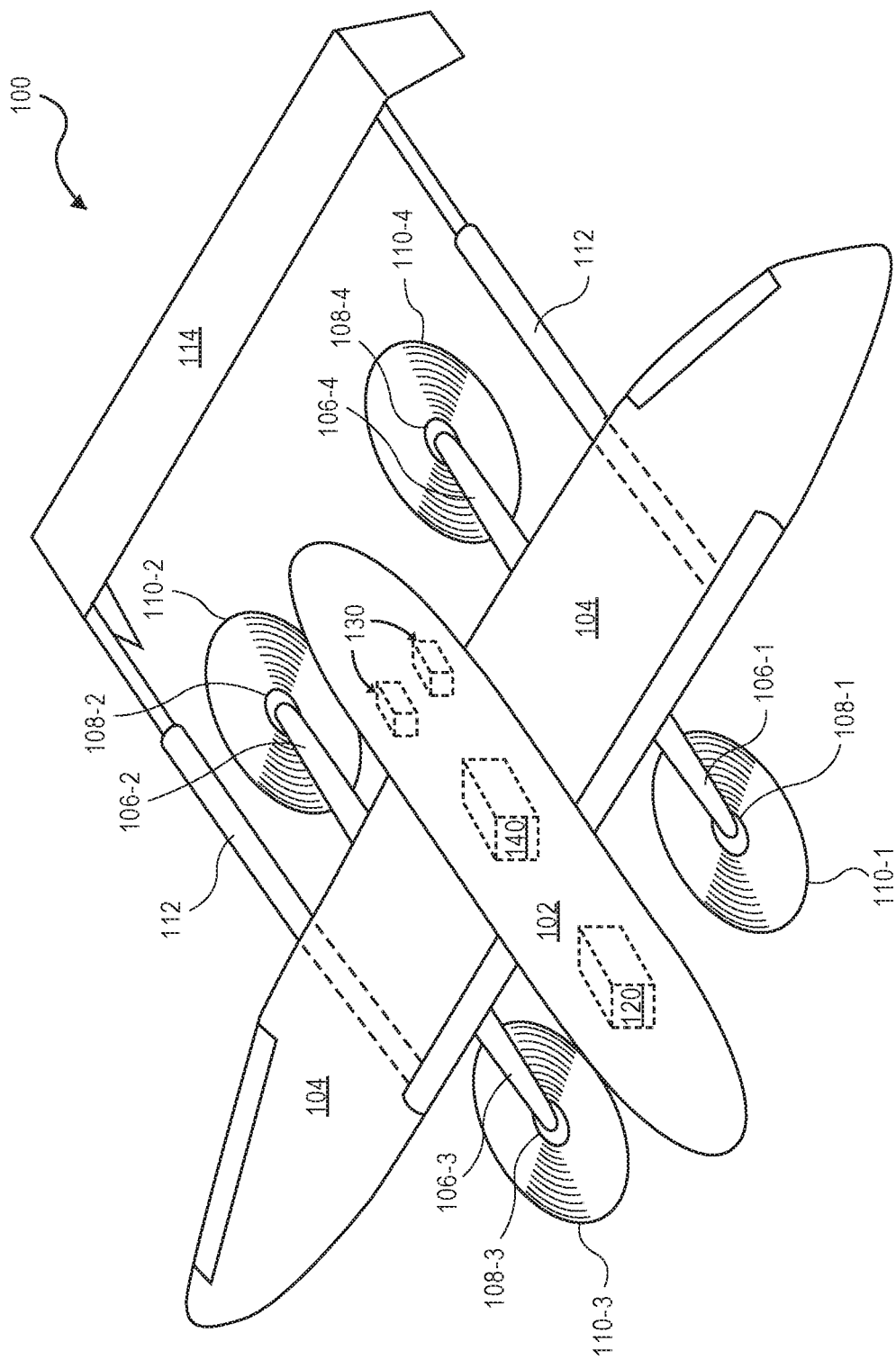
FIG. 1 is a schematic diagram of an aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Aerial vehicles may include a variety of adjustable shrouds, according to implementations of the present disclosure. The adjustable shrouds, when extended or deployed, may provide safety to other objects in proximity, as well as to the aerial vehicle, by preventing contact with the propellers of the aerial vehicle. In addition, the adjustable shrouds, when retracted or stowed, may eliminate or minimize adverse effects to aerodynamic properties or flight characteristics of the aerial vehicle.

For example, the adjustable shrouds may be extended or deployed during aerial vehicle operation such as vertical takeoff and landing, at particular locations, e.g., low altitudes or delivery locations, along particular portions of a flight path, and/or with other objects in proximity (e.g., within a determined distance of the aerial vehicle) or in congested environments. Likewise, the adjustable shrouds may be retracted or stowed during aerial vehicle operation such as horizontal flight, at particular locations, e.g., high altitudes, along particular portions of a flight path, and/or with no other objects in proximity (e.g., within a determined distance of the aerial vehicle) or in open environments.

In some implementations, the adjustable shroud may be an adjustable fan shroud that rotatably extends at least partially around a periphery or perimeter of a propeller to prevent contact with the propeller. Likewise, the adjustable fan shroud may rotatably retract from around the periphery or perimeter of the propeller to eliminate or minimize adverse aerodynamic effects. The adjustable fan shroud may comprise one or more shroud sections that rotatably telescope around the propeller. In addition, the adjustable fan shroud may be extended or retracted using an actuator, using a counter torque of a motor of the propeller, or using forces generated by movement of the aerial vehicle, e.g., rotational forces or centrifugal forces.

In other implementations, the adjustable shroud may be an adjustable folding shroud that extends around a periphery or perimeter of a propeller to prevent contact with the propeller. Likewise, the adjustable folding shroud may retract and maintain the propeller in a static position to eliminate or minimize adverse aerodynamic effects. The adjustable folding shroud may comprise one or more shroud sections that are moved linearly along a motor arm supporting a motor and the propeller. In addition, the adjustable folding shroud may include flexible portions or hinged portions that facilitate extension or retraction of the shroud sections. Further, the adjustable folding shroud may be extended or retracted using an actuator, or using forces generated by movement of the aerial vehicle, e.g., translational forces, rotational forces, or centrifugal forces.

In further implementations, the adjustable shroud may be an adjustable arm shroud that extends at least partially around a periphery or perimeter of a propeller to prevent contact with the propeller. Likewise, the adjustable arm shroud may retract from around the periphery or perimeter of the propeller to eliminate or minimize adverse aerodynamic effects. The adjustable arm shroud may comprise an arm coupled to a slider via a guide rod, and the slider may move along a motor arm supporting a motor and the propeller to extend or retract the arm via the guide rod. Alternatively, the adjustable arm shroud may comprise an arm coupled, via a first bar and a second bar, to a motor arm supporting a motor and the propeller, in which the first bar may move in a substantially vertical plane and the second bar may move in a substantially horizontal plane to extend or retract the arm. In a further alternative, the adjustable arm shroud may comprise an arm coupled to a fuselage of the aerial vehicle via a telescoping rod and a slider that moves along a motor arm supporting a motor and the propeller, and the slider may move along the motor arm to extend or retract the arm via the telescoping rod. In addition, the adjustable arm shrouds may be extended or retracted using an actuator, or using forces generated by movement of the aerial vehicle, e.g., translational forces, rotational forces, or centrifugal forces.

In some implementations, the adjustable shroud may be an adjustable leading edge shroud that extends at least partially around a periphery or perimeter of a propeller to prevent contact with the propeller. Likewise, the adjustable leading edge shroud may retract from around the periphery or perimeter of the propeller to eliminate or minimize adverse aerodynamic effects. The adjustable leading edge shroud may comprise at least a portion of a leading edge of a wing of the aerial vehicle that extends and retracts via a guide rod. In addition, the adjustable leading edge shroud may be extended or retracted using an actuator, or using forces generated by movement of the aerial vehicle, e.g., translational forces, rotational forces, or centrifugal forces.

In other implementations, the adjustable shroud may be an adjustable leading edge and tail plane shroud that extends at least partially around a periphery or perimeter of a propeller to prevent contact with the propeller. Likewise, the adjustable leading edge and tail plane shroud may retract from around the periphery or perimeter of the propeller to eliminate or minimize adverse aerodynamic effects. The adjustable leading edge and tail plane shroud may comprise at least a portion of a leading edge of a wing of the aerial vehicle and at least a portion of a tail plane of the aerial vehicle that together extend and retract via one or more guide rods. In addition, the adjustable leading edge and tail plane shroud may be extended or retracted using an actuator, or using forces generated by movement of the aerial vehicle, e.g., translational forces, rotational forces, or centrifugal forces.

In further implementations, the adjustable shroud may be an adjustable tail plane shroud that rotatably extends at least partially around a periphery or perimeter of a propeller to prevent contact with the propeller. Likewise, the adjustable tail plane shroud may rotatably retract from around the periphery or perimeter of the propeller to eliminate or minimize adverse aerodynamic effects. The adjustable tail plane shroud may comprise at least a portion of a tail plane of the aerial vehicle that rotatably extends or retracts relative to a periphery or perimeter of a propeller. In addition, the adjustable tail plane shroud may be rotatably extended or retracted using an actuator, or using forces generated by movement of the aerial vehicle, e.g., translational forces, rotational forces, or centrifugal forces.

FIG. 1 is a schematic diagram of an aerial vehicle 100, according to an implementation. The aerial vehicle 100 may include a fuselage 102, a wing 104, one or more motor arms 106, one or more motors 108, one or more propellers 110, one or more boom arms 112, and a tail plane 114. Although a particular configuration of an aerial vehicle 100 is shown in FIG. 1, the adjustable shrouds as described herein may be used with any other configuration of an aerial vehicle having at least one propeller, or other propulsion mechanism, that may be selectively shrouded for safety.

The fuselage 102 may form a main or central body or portion of the aerial vehicle 100. The fuselage 102 may be formed of any suitable material, such as metal, plastic, carbon fiber, other materials, or combinations thereof. The fuselage 102 may have any shape, and may be shaped to reduce aerodynamic drag, for example. Various components may be housed or contained at least partially within the fuselage 102, including an aerial vehicle control system 120, one or more power supplies 130, a payload 140, as well as other electronic, avionic, operational, navigational and/or communication systems or components, sensor systems or components, controllers, processors, memory, and others. Connected to the fuselage 102 may be the wing 104, one or more motor arms 106, and one or more boom arms 112.

The wing 104 may extend from either side of the fuselage 102, or may be a single continuous wing 104 that is coupled to the fuselage 102. The wing 104 may be formed of any suitable material, such as metal, plastic, carbon fiber, other materials, or combinations thereof. The wing 104 may have a cross-sectional shape in the form of an airfoil to provide lift to the aerial vehicle 100 during generally horizontal flight. In addition, the wing 104 may include one or more ailerons, flaps, or other control surfaces to control flight characteristics of the aerial vehicle 100. Connected to the wing 104 may be one or more motor arms 106, and one or more boom arms 112.

The one or more motor arms 106 may be coupled to and extend from one of the fuselage 102 or the wing 104. The motor arms 106 may be formed of any suitable material, such as metal, plastic, carbon fiber, other materials, or combinations thereof. The motor arms 106 may have any shape, and may be shaped to reduce aerodynamic drag, for example. Each motor arm 106 may include a motor 108 and corresponding propeller 110 along a portion of its length, e.g., at an end distal from a connection to the fuselage 102 or the wing 104.

Each of the motors 108 may rotate a corresponding propeller 110 to generate thrust for lifting and/or maneuvering the aerial vehicle 100. The motors 108 may be any suitable type of motor capable of generating, in combination with the corresponding propeller 110, thrust to lift and/or maneuver the aerial vehicle 100 or at least a portion of the aerial vehicle 100.

Each of the propellers 110 may include one or more blades that are rotated by the corresponding motor 108. Each of the blades of the propeller 110 may have a cross-sectional shape in the form of an airfoil to provide thrust to the aerial vehicle 100 during operation. In addition, the blades of the propeller 110 may be formed of any suitable material, such as metal, plastic, carbon fiber, other materials, or combinations thereof.

In the example aerial vehicle 100 shown in FIG. 1, four motor arms 106-1, 106-2, 106-3, 106-4 are coupled to and extend from one of the fuselage 102 or the wing 104, and each motor arm includes a motor 108-1, 108-2, 108-3, 108-4 and corresponding propeller 110-1, 110-2, 110-3, 110-4. Although FIG. 1 shows the motor arms 106, motors 108, and propellers 110 coupled to the fuselage 102 or the wing 104 in a particular configuration and in a vertically downward facing direction from the fuselage 102 or the wing 104, other configurations and/or orientations are possible. For example, the motor arms 106, motors 108, and propellers 110 may be coupled to the fuselage 102 or the wing 104 in a vertically upward facing direction, or in various combinations of vertically downward facing and vertically upward facing motor arms, motors, and propellers. Although the aerial vehicle 100 shown in FIG. 1 includes four motor arms 106, four motors 108, and four propellers 110, any other number or combination of motor arms, motors, or propellers is possible. Further, any other types of propulsion mechanisms may be used in place of or in combination with those shown in FIG. 1, including fans, jets, turbojets, turbo fans, jet engines, electric jets, and the like, and/or combinations thereof. In addition, other configurations of aerial vehicles may not include motor arms 106, and instead, one or more of the motors 108 and propellers 110 may be connected directly to the fuselage, the wing, or any other frame or body portions of the aerial vehicle. Further, any of the various adjustable shrouds described herein may be utilized to selectively extend around or retract from a periphery of a propeller rotated by a motor that is connected directly to the fuselage, the wing, or any other frame or body portions of the aerial vehicle.

The one or more boom arms 112 may be coupled to and extend from one of the fuselage 102 or the wing 104. Each boom arm 112 may couple to a portion of the tail plane 114 at an end distal from a connection to the fuselage 102 or the wing 104, and each boom arm 112 may extend forward of the fuselage 102 or the wing 104 as well. In some embodiments, one or more of the boom arms 112 and one or more of the motor arms 106 may be integrally formed, such that portions of the fuselage 102, wing 104, motors 108, propellers 110, and/or the tail plane 114 may all be coupled to the one or more boom arms 112. The boom arms 112 may be formed of any suitable material, such as metal, plastic, carbon fiber, other materials, or combinations thereof. The boom arms 112 may have any shape, and may be shaped to reduce aerodynamic drag, for example. As described further herein, each boom arm 112 may include one or more portions that may be translatable, rotatable, or otherwise movable relative to each other to alter a configuration of the aerial vehicle 100 and selectively provide shrouding at least partially around one or more propellers 110. The one or more portions of each boom arm 112, when positioned in a retracted position for generally horizontal flight, may be configured to align with each other within a plane, stack on top of each other, couple to each other, or combinations thereof.

The tail plane 114 may be coupled to the one or more boom arms 112 and extend at least partially across a width of the aerial vehicle 100. The tail plane 114 may be formed of any suitable material, such as metal, plastic, carbon fiber, other materials, or combinations thereof. The tail plane 114 may have a cross-sectional shape in the form of an airfoil to provide lift to the aerial vehicle 100 during generally horizontal flight. In addition, the tail plane 114 may include one or more ailerons, flaps, or other control surfaces to control flight characteristics of the aerial vehicle 100. As described further herein, the tail plane 114 may be formed in one or more portions that may be translatable, rotatable, or otherwise movable relative to each other to alter a configuration of the aerial vehicle 100 and selectively provide shrouding at least partially around one or more propellers 110. The one or more portions of the tail plane 114, when positioned in a retracted position for generally horizontal flight, may be configured to align with each other within a plane, stack on top of each other, couple to each other, or combinations thereof.

The aerial vehicle control system 120 may control the operation of various components of the aerial vehicle 100, including the motors 108 and corresponding propellers 110 or other propulsion mechanisms, adjustable shroud actuators as described herein, any electronic, avionic, operational, navigational and/or communication systems or components, sensor systems or components, controllers, processors, and other components of the aerial vehicle 100. For example, the aerial vehicle control system 120 may transmit instructions to the motors 108 and corresponding propellers 110 (and/or other propulsion mechanisms), as well as actuators associated with ailerons, flaps, or other control surfaces, to control flight and navigation of the aerial vehicle 100, may transmit instructions to monitor operation, location, flight path, and/or an environment of the aerial vehicle 100, e.g., using electronic, avionic, operational, navigational, communication, and/or sensor systems or components, and/or may transmit instructions to extend or retract adjustable shrouds, e.g., using shroud actuators, using counter torques of motors, or using forces generated by movement of the aerial vehicle. While the aerial vehicle control system 120 is shown in FIG. 1 at a particular location on aerial vehicle 100, the aerial vehicle control system 120 may be positioned at any suitable location on aerial vehicle 100.

In addition, the aerial vehicle control system 120 may communicate (via wired or wireless communication) with one or more other aerial vehicles and/or with an aerial vehicle management system or control station in order to receive and/or transmit data and information. As discussed in further detail with respect to FIG. 11, the aerial vehicle control system 120 may control at least the operation, routing, navigation, and communication of the aerial vehicle 100.

The sensor systems or components (not shown) of the aerial vehicle 100 may include image capture devices, infrared sensors, thermal sensors, time of flight sensors, radar sensors, LIDAR sensors, accelerometers, altitude sensors, pressure sensors, weather sensors, GPS (Global Positioning System) sensors, and/or other sensors. The data and information received, processed, and/or analyzed by the sensor systems may be used by the aerial vehicle control system 120 to control at least the operation, routing, navigation, and communication of the aerial vehicle 100. For example, the aerial vehicle control system 120 may use the data and information received, processed, and/or analyzed by the sensor systems to monitor operation, location, flight path, and/or an environment of the aerial vehicle 100, and to control the extension or retraction of the adjustable shrouds based on the data and information.

The one or more power supplies 130 may include a battery, capacitor, or any other electrical energy storage component to provide power to the motors 108 or other propulsion mechanisms, adjustable shroud actuators as described herein, any electronic, avionic, operational, navigational and/or communication systems or components, sensor systems or components, controllers, processors, and other components of the aerial vehicle 100. While the power supplies 130 are shown in FIG. 1 at particular locations on aerial vehicle 100, the power supplies 130 may be positioned at any suitable locations on aerial vehicle 100.

The payload 140 may be any suitable item, object, apparatus, or component to be acquired, carried, delivered, and/or released by the aerial vehicle 100. For example, the payload 140 may be an item ordered by a customer to be delivered by the aerial vehicle 100 to a location associated with the customer, or any other location associated with the delivery. The payload 140 may be acquired, carried, and/or released by any suitable payload engagement mechanism of the aerial vehicle 100, including access doors, grasping mechanisms having opening/closing arms or digits, suction mechanisms, electro-adhesion mechanisms, magnetic attachment mechanisms, roller- or conveyor-type mechanisms, and the like. While the payload 140 is shown in FIG. 1 at a particular location on aerial vehicle 100, the payload 140 may be positioned at any suitable location on aerial vehicle 100.

FIGS. 2A and 2B are schematic diagrams of an adjustable fan shroud 200 in a first configuration and a second configuration, respectively, according to an implementation. The motor arm 106, motor 108, and propeller 110 shown in FIGS. 2A and 2B may be any of the respective combination of components shown in FIG. 1, or any similar combination of a motor arm, motor, and propeller (or other propulsion mechanism) of an aerial vehicle configured differently than that shown in FIG. 1.

The adjustable fan shroud 200 may include one or more shroud sections 202 that are connected to a shroud actuator 208 via one or more shroud section arms 204. The shroud sections 202 and shroud section arms 204 may be formed of any suitable material, such as metal, plastic, carbon fiber, other materials, or combinations thereof.

FIG. 2A shows the shroud sections 202 and shroud section arms 204 in a retracted or stowed configuration within cavity 206 of motor arm 106. The shroud sections 202 and shroud section arms 204 may be formed so as to stack or overlap with each other in order to reduce their overall width and fit within the cavity 206 when in the retracted configuration. For example, the dimensions of the shroud sections 202 and the cavity 206 may be determined such that the shroud sections 202 substantially fit entirely within the cavity 206 when in the retracted configuration, thereby eliminating or minimizing adverse aerodynamic effects. The shroud sections 202 may be formed in any shape, e.g., curved, angled, smooth, or otherwise aerodynamically shaped.

FIG. 2B shows the shroud sections 202 and shroud section arms 204 in an extended or deployed configuration at least partially around a periphery or perimeter of the propeller 110. Each of the shroud sections 202 may be formed so as to telescope around the periphery of the propeller 110, thereby shrouding the propeller for safety. In addition, each of the shroud sections 202 or shroud section arms 204 may at least partially engage or interlock with adjacent shroud sections 202 or shroud section arms 204 to maintain a partially overlapping configuration with adjacent shroud sections 202 when in the extended configuration. For example, the engagement or interlocking between adjacent shroud sections 202 or shroud section arms 204 may be achieved using groove-pin structures, overlapping or interlocking lips, edges, or hooks, frictionally engaging structures, or other similar mechanisms.

In some implementations, the shroud sections 202 and/or shroud section arms 204 may include flexible or compressible materials that permit compression of the shroud sections 202 and/or shroud section arms 204 when in the retracted configuration and also permit expansion of the shroud sections 202 and/or shroud section arms 204 when in the extended configuration. For example, each of the shroud sections 202 may be formed partially of metal, plastic, or carbon fiber, and also formed partially of flexible or compressible materials, such that each shroud section 202 may expand its width by expanding the flexible material portion when in the extended configuration and may reduce its width by compressing the flexible material portion when in the retracted configuration.

The shroud section arms 204 may rotatably connect the shroud sections 202 to the actuator 208. The actuator 208 may be any suitable actuator configured to extend or retract the shroud sections 202, e.g., servo, rotary, pneumatic, hydraulic, or other actuator. For example, the actuator 208 may be instructed by an adjustable shroud controller, as described herein, to extend or retract the shroud sections 202. In addition, the shroud sections 202 and shroud section arms 204 may be biased, e.g., using a spring or other resilient element, to one of the retracted configuration within cavity 206 or the extended configuration at least partially around the periphery of the propeller 110.

In some implementations, the shroud sections 202 and shroud section arms 204 may be actuated using the counter torque of the motor 108. For example, a rotor of the motor 108 may be operatively connected to the propeller 110 to rotate the propeller. A stator of the motor 108 may have a rotational degree of freedom relative to its mounting on motor arm 106, e.g., the stator may be able to rotate 90, 180, 270, or 360 degrees, or any other degree of rotation, relative to the motor arm 106. In addition, the stator of the motor 108 may be operatively connected to one or more shroud sections 202 via one or more shroud section arms 204. In operation, rotation of the propeller 110 by the rotor of the motor 108 in one rotational direction may generate a counter torque on the stator of the motor 108 in an opposite rotational direction, and the counter torque may be used to extend or retract the shroud sections 202 via the shroud section arms 204. In one example configuration, the stator of the motor 108 may be operatively connected to shroud section arm 204-1 and extend or retract shroud section 202-1 using the counter torque of the motor 108, and remaining shroud sections 202 may be interconnected or interlocked with shroud section 202-1 so as to extend or retract the adjustable fan shroud 200.

In other implementations, the shroud sections 202 and shroud section arms 204 may be actuated using forces generated by movement of the aerial vehicle 100. For example, by causing the aerial vehicle 100 to rotate or spin, the shroud sections 202 and shroud section arms 204 may be caused to move to the extended configuration or the retracted configuration based on the direction of rotation of the aerial vehicle 100 and the relative orientations of the shroud sections 202 and shroud section arms 204.

Although three shroud sections 202-1, 202-2, 202-3 and three shroud section arms 204-1, 204-2, 204-3 are shown in FIGS. 2A and 2B, any number or combination of shroud sections 202 and shroud section arms 204 may be provided in the adjustable fan shroud 200. In addition, although the shroud sections 202 are shown partially surrounding the periphery of the propeller 110 in FIG. 2B, the same or different number of shroud sections 202 may be used to completely surround, or surround a different portion of, the periphery of the propeller 110.

In still other implementations, the adjustable fan shroud may include floating shroud sections 202 that do not include any shroud section arms 204 connected to an actuator 208. Instead, a first floating shroud section 202 may be attached to a portion of the cavity 206, each of the floating shroud sections 202 may engage, interlock, and/or telescope with adjacent shroud sections 202, and a final floating shroud section 202 may be configured to attach to an opposing side of the motor arm 106, e.g., opposite the cavity 206, or attach to another structure. The engagement or interlocking between adjacent floating shroud sections 202 may be achieved using groove-pin structures, overlapping or interlocking lips, edges, or hooks, frictionally engaging structures, or other similar mechanisms. The attachment of the final floating shroud section 202 to another structure or an opposing side of the motor arm 106 may be achieved using various structures, e.g., magnetic coupling, electro-adhesion, vacuum or suction, interlocking structures, frictional engagement, or other attachment mechanisms. In this manner, a floating fan shroud formed of a plurality of floating shroud sections 202 may completely surround the periphery of the propeller 110 when in the extended configuration and may also retract substantially entirely within the cavity 206 when in the retracted configuration.

The floating shroud sections 202 may be actuated by any suitable actuator configured to extend or retract the floating shroud sections 202, e.g., pneumatic, hydraulic, or other actuator. For example, the actuator may be instructed by an adjustable shroud controller, as described herein, to extend or retract the floating shroud sections 202. In addition, the floating shroud sections 202 may be biased, e.g., using a spring or other resilient element, to one of the retracted configuration within cavity 206 or the extended configuration around the periphery of the propeller 110.

In other implementations, the floating shroud sections 202 may be actuated using forces generated by movement of the aerial vehicle 100. For example, by causing the aerial vehicle 100 to rotate or spin, the floating shroud sections 202 may be caused to move to the extended configuration or the retracted configuration based on the direction of rotation of the aerial vehicle 100 and the relative orientations of the shroud sections 202 and shroud section arms 204.

Figure 3A:
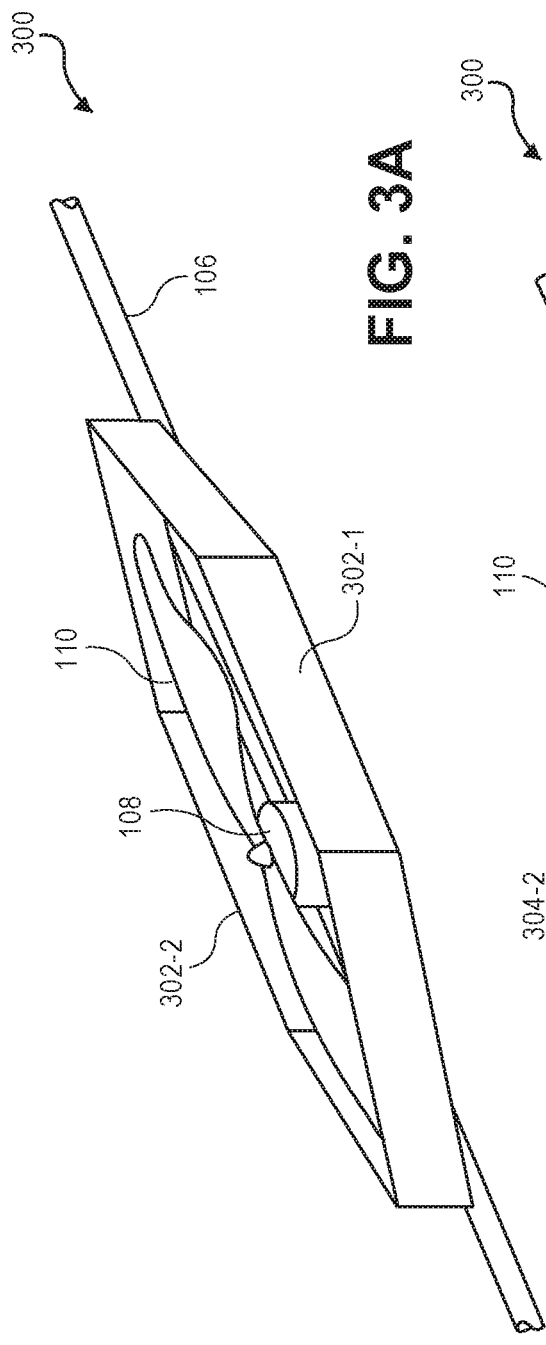
FIG. 3A is a schematic diagram of an adjustable folding shroud in a first configuration, according to an implementation.
Figure 3B:
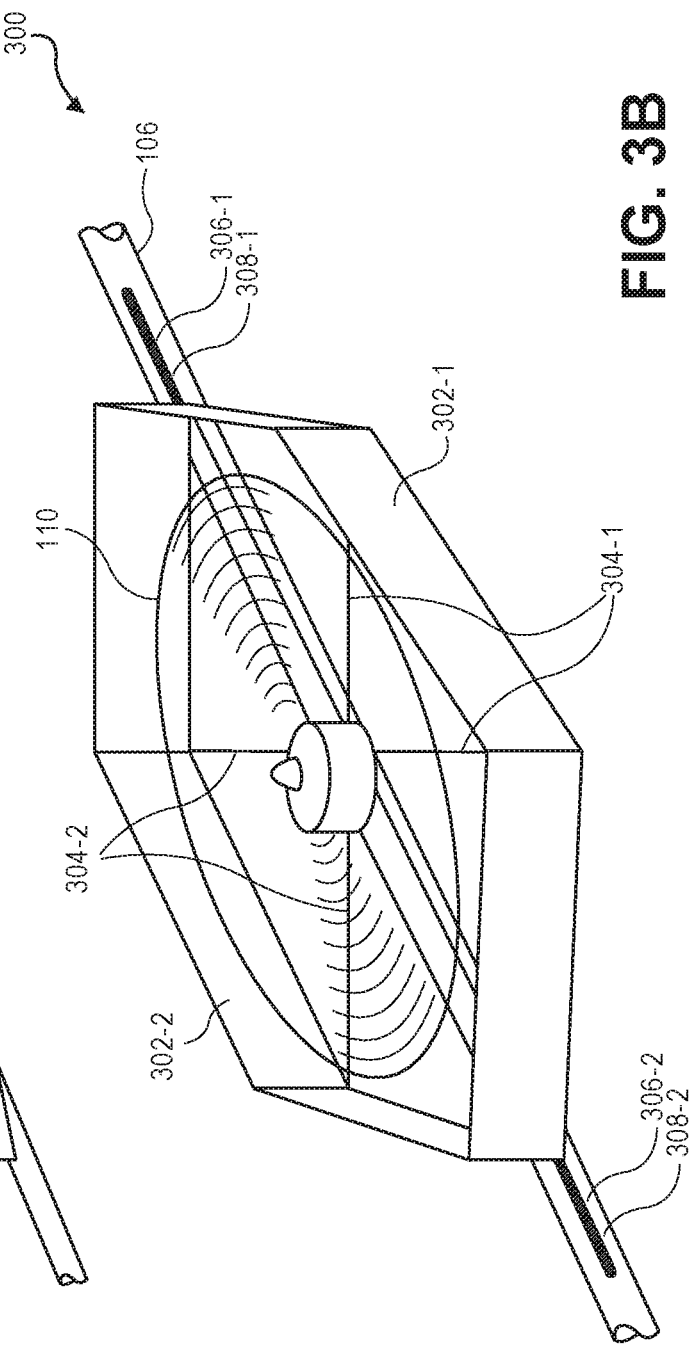
FIG. 3B is a schematic diagram of the adjustable folding shroud in a second configuration, according to an implementation.

FIGS. 3A and 3B are schematic diagrams of an adjustable folding shroud 300 in a first configuration and a second configuration, respectively, according to an implementation. The motor arm 106, motor 108, and propeller 110 shown in FIGS. 3A and 3B may be any of the respective combination of components shown in FIG. 1, or any similar combination of a motor arm, motor, and propeller (or other propulsion mechanism) of an aerial vehicle configured differently than that shown in FIG. 1.

The adjustable folding shroud 300 may include one or more shroud sections 302 that are connected to one or more shroud actuators 308 via one or more shroud actuator slots 306. The shroud sections 302 may also be connected to the motor arm 106, e.g., substantially near a center attachment point of the motor 108 to the motor arm 106, by one or more shroud section links 304. The shroud sections 302 and shroud section links 304 may be formed of any suitable material, such as metal, plastic, carbon fiber, other materials, flexible or compressible materials, or combinations thereof. For example, the shroud section links 304 may comprise tension cables made of any suitable materials.

FIG. 3A shows the shroud sections 302 in a retracted configuration that is compressed around the propeller 110 and maintains the propeller 110 in a static position. Each shroud section 302-1, 302-2 may include one or more portions that are flexible and/or hinged to each other. In addition, the ends of the shroud sections 302-1, 302-2 may be joined to each other. The shroud sections 302 may be formed or held in an aerodynamic shape when in the retracted configuration. For example, the shroud sections 302 may be curved, angled, smooth, or otherwise shaped to compress around the propeller 110 and assume an aerodynamic shape, thereby eliminating or minimizing adverse aerodynamic effects.

FIG. 3B shows the shroud sections 302 and shroud section links 304 in an extended or deployed configuration around a periphery or perimeter of the propeller 110. Each shroud section 302-1, 302-2 may include one or more portions that are flexible and/or hinged to each other. In addition, the ends of the shroud sections 302-1, 302-2 may be joined to each other. In the extended configuration, the shroud sections 302 may be expanded to allow rotation of the propeller 110 within the shroud sections 302, and the shroud section links 304 may facilitate maintaining a shape of the extended configuration. For example, the shroud sections 302 may form a hexagonal, polygonal, elliptical, or circular shape around the periphery of the propeller 110, thereby shrouding the propeller for safety.

The ends of each shroud section 302-1, 302-2 may be coupled to shroud actuators 308-1, 308-2 via shroud actuator slots 306-1, 306-2. For example, pins, hooks, rods, or other similar elements at the ends of each shroud section 302 may extend through the shroud actuator slots 306 and couple to the shroud actuators 308. By moving the ends of the shroud sections 302-1, 302-2 away from each other using the shroud actuators 308-1, 308-2, the adjustable folding shroud 300 may be moved to the retracted configuration. Likewise, by moving the ends of the shroud sections 302-1, 302-2 toward each other using the shroud actuators 308-1, 308-2, the adjustable folding shroud 300 may be moved to the extended configuration. In this manner, each shroud section 302 may expand or retract via actuation of the shroud actuators 308 along the lengths of the shroud actuator slots 306. The actuator 308 may be any suitable actuator configured to extend or retract the shroud sections 302, e.g., servo, linear, screw, pneumatic, hydraulic, solenoid, rack and pinion, or other actuator. For example, the actuator 308 may be instructed by an adjustable shroud controller, as described herein, to extend or retract the shroud sections 302. In addition, the shroud sections 302 and shroud section links 304 may be biased, e.g., using a spring or other resilient element, to one of the retracted configuration that compresses around the propeller 110 or the extended configuration that expands around the periphery of the propeller 110.

Although two shroud actuators 308-1, 308-2 and two shroud actuator slots 306-1, 306-2 are shown in FIGS. 3A and 3B, any number or combination of shroud actuators 308 and shroud actuator slots 306 may be provided in the adjustable folding shroud 300. For example, only one shroud actuator 308 and one shroud actuator slot 306 may be coupled to one end of the shroud sections 302, with the other end of the shroud sections 302 being fixed along the length of the motor arm 106.

In other implementations, the shroud sections 302 and shroud section links 304 may be actuated using forces generated by movement of the aerial vehicle 100. For example, by causing the aerial vehicle 100 to accelerate, rotate, or spin, the shroud sections 302 may be caused to move along the shroud actuator slots 306 to the extended configuration or the retracted configuration based on the motion of the aerial vehicle 100, depending on the orientations of the shroud sections 302 and shroud actuator slots 306.

Although two shroud sections 302-1, 302-2 and four shroud section links 304-1, 304-2 are shown in FIGS. 3A and 3B, any number or combination of shroud sections 302 and shroud section links 304 may be provided in the adjustable folding shroud 300. In addition, although FIGS. 3A and 3B show shroud sections 302 that form a hexagonal shape in the extended configuration, the shroud sections 302 may form any other shape, e.g., rectangular, octagonal, polygonal, elliptical, circular, other shapes, or combinations thereof.

FIGS. 4A and 4B are schematic diagrams of a first adjustable arm shroud 400 in a first configuration and a second configuration, respectively, according to an implementation. The motor arm 106, motor 108, and propeller 110 shown in FIGS. 4A and 4B may be any of the respective combination of components shown in FIG. 1, or any similar combination of a motor arm, motor, and propeller (or other propulsion mechanism) of an aerial vehicle configured differently than that shown in FIG. 1.

The first adjustable arm shroud 400 may include one or more arms 402 that are connected to a slider 406 via one or more guide rods 404. For example, a first end of the arm 402 may be rotatably or pivotably coupled to the motor arm 106, and a second end of the arm 402 may be rotatably or pivotably coupled to a first end of the guide rod 404. In addition, a second end of the guide rod 404 may be rotatably or pivotably coupled to the slider 406. The slider 406 may be coupled to an actuator 408, e.g., via a slot (not shown) in the motor arm 106, that moves the slider 406 along a portion of the length of the motor arm 106. The one or more arms 402, one or more guide rods 404, and slider 406 may be formed of any suitable material, such as metal, plastic, carbon fiber, other materials, flexible or compressible materials, or combinations thereof.

FIG. 4A shows the arm 402 in a retracted or stowed configuration adjacent the motor arm 106 and outside the plane of the propeller 110. In the retracted configuration, the slider 406 is positioned at one end of its travel along the motor arm 106 to pivot the arm 402 adjacent the motor arm 106 via the guide rod 404, thereby eliminating or minimizing adverse aerodynamic effects. The arm 402 may be formed in any shape, e.g., straight, curved, angled, smooth, or otherwise aerodynamically shaped.

FIG. 4B shows the arm 402 in an extended or deployed configuration at least partially around a periphery or perimeter of the propeller 110. In the extended configuration, the slider 406 is positioned at an opposite end of its travel along the motor arm 106, relative to the slider's position in the retracted configuration, to pivot the arm 402 to the extended position via the guide rod 404, thereby shrouding the propeller for safety.

The slider 406 may be coupled to an actuator 408 via an actuator slot (not shown) formed in motor arm 106. For example, pins, hooks, rods, or other similar elements of the slider 406 may extend through the actuator slot and couple to the actuator 408. In this manner, the slider 406 may move along a portion of the length of the motor arm 106 via actuation of the actuator 408 and extend or retract the arm 402 by the connection through the guide rod 404. The actuator 408 may be any suitable actuator configured to move the slider 406 along the motor arm 106, e.g., servo, linear, screw, pneumatic, hydraulic, solenoid, rack and pinion, or other actuator. For example, the actuator 408 may be instructed by an adjustable shroud controller, as described herein, to extend or retract the arm 402. In addition, the slider 406 may be biased, e.g., using a spring or other resilient element, to one end of its travel along the motor arm 106, thereby biasing the arm 402 to one of the retracted configuration adjacent the motor arm 106 or the extended configuration at least partially around the periphery of the propeller 110.

In other implementations, the slider 406 may be actuated using forces generated by movement of the aerial vehicle 100. For example, by causing the aerial vehicle 100 to accelerate, rotate, or spin, the slider 406 may be caused to move along a portion of the length of the motor arm 106 based on the motion of the aerial vehicle 100, thereby moving the arm 402 to one of the extended configuration or the retracted configuration, depending on the orientations of the arm 402, guide rod 404, and slider 406.

The actuator slot along which the slider 406 moves may be a straight slot that extends parallel to an axis of the motor arm 106. Alternatively, the actuator slot may extend at an angle to the axis of the motor arm 106 or have any other shape, e.g., curved, arcuate, or angled. The actuator slot may be formed so as to induce a particular movement of the slider 406, and thereby corresponding movements of the guide rod 404 and arm 402. For example, if the actuator slot is a straight slot that extends parallel to an axis of the motor arm 106, the arm 402 may move along a flat plane between the retracted and extended configurations. Alternatively, if the actuator slot is curved, arcuate, or angled, the arm 402 may move along an arc or other non-planar shape between the retracted and extended configurations. In this manner, although the arm 402 is located outside the plane of the propeller 110 in the retracted configuration, the arm 402 may move closer to or into the plane of the propeller 110 in the extended configuration.

Although one arm 402, one guide rod 404, and one slider 406 are shown in FIGS. 4A and 4B, any number or combination of arms 402, guide rods 404, and sliders 406 may be provided in the first adjustable arm shroud 400. For example, two or more arms 402 and two or more guide rods 404 may be connected to a single slider 406, such that movement of the slider 406 along a portion of the length of the motor arm 106 causes simultaneous movement of the two or more arms 402 via the two or more guide rods 404. Alternatively, two or more sliders 406 may also be provided in the first adjustable arm shroud 400 to independently move two or more arms 402 via two or more guide rods 404.

FIGS. 5A and 5B are schematic diagrams of a second adjustable arm shroud 500 in a first configuration and a second configuration, respectively, according to an implementation. The motor arm 106, motor 108, and propeller 110 shown in FIGS. 5A and 5B may be any of the respective combination of components shown in FIG. 1, or any similar combination of a motor arm, motor, and propeller (or other propulsion mechanism) of an aerial vehicle configured differently than that shown in FIG. 1.

The second adjustable arm shroud 500 may include an arm 502 or shroud section that is connected to the motor arm 106 via a first bar 504-1 and a second bar 504-2. For example, a first end of the first bar 504-1 may be rotatably or pivotably coupled to the motor arm 106, and a second end of the first bar 504-1 may be rotatably or pivotably coupled proximate to a first end of the arm 502, e.g., via ball joint. Similarly, a first end of the second bar 504-2 may be rotatably or pivotably coupled to the motor arm 106, and a second end of the second bar 504-2 may be rotatably or pivotably coupled proximate to a second end of the arm 502, e.g., via ball joint. The first bar 504-1 may be coupled to an actuator 508-1 near its first end, and the second bar 504-2 may be coupled to an actuator 508-2 near its first end. The arm 502, first bar 504-1, and second bar 504-2 may be formed of any suitable material, such as metal, plastic, carbon fiber, other materials, flexible or compressible materials, or combinations thereof.

FIG. 5A shows the arm 502 in a retracted or stowed configuration adjacent the motor arm 106 and outside the plane of the propeller 110. In the retracted configuration, each of the first bar 504-1 and the second bar 504-2 is moved to a position adjacent the motor arm 106, which moves the arm 502 adjacent the motor arm 106 as well, thereby eliminating or minimizing adverse aerodynamic effects. The arm 502 may be formed in any shape, e.g., straight, curved, angled, smooth, or otherwise aerodynamically shaped.

FIG. 5B shows the arm 502 in an extended or deployed configuration at least partially around a periphery or perimeter of the propeller 110. In the extended configuration, each of the first bar 504-1 and the second bar 504-2 is moved to a position that moves the arm 502 to the extended configuration, thereby shrouding the propeller for safety. For example, the first bar 504-1 may rotate within a substantially vertical plane that is perpendicular to the plane of the propeller 110 between the positions shown in FIGS. 5A and 5B. In addition, the second bar 504-2 may rotate within a substantially horizontal plane that is parallel to the plane of the propeller 110 between the positions shown in FIGS. 5A and 5B. With the combined motions of the first bar 504-1 and second bar 504-2, the arm 502 may be moved between the retracted configuration and the extended configuration without interfering with the propeller 110, e.g., downward and around the propeller or upward and around the propeller, depending on the particular configuration of the aerial vehicle.

The arm 502 may be pivotably coupled to the second ends of the first bar 504-1 and the second bar 504-2 via ball joints, for example. In addition, the first ends of the first bar 504-1 and the second bar 504-2 may be rotatably coupled to the motor arm 106 and actuated by respective actuators 508-1, 508-2. The actuators 508 may be any suitable actuators configured to rotate the first and second bars 504, e.g., servo, rotary, pneumatic, hydraulic, or other actuator. For example, the actuators 508 may be instructed by an adjustable shroud controller, as described herein, to extend or retract the arm 502. In addition, the first and second bars 504, and thereby the arm 502, may be biased, e.g., using a spring or other resilient element, to one of the retracted configuration adjacent the motor arm 106 or the extended configuration at least partially around the periphery of the propeller 110.

In other implementations, the first and second bars 504 may be actuated using forces generated by movement of the aerial vehicle 100. For example, by causing the aerial vehicle 100 to accelerate, rotate, or spin, the first and second bars 504 may be caused to rotate relative to the motor arm 106 based on the motion of the aerial vehicle 100, thereby moving the arm 502 to one of the extended configuration or the retracted configuration, depending on the orientations of the arm 502, first bar 504-1, and second bar 504-2.

Although one arm 502, one first bar 504-1, and one second bar 504-2 are shown in FIGS. 5A and 5B, any number or combination of arms 502, first bars 504-1, and second bars 504-2 may be provided on the aerial vehicle 100. For example, the aerial vehicle 100 may include a second arm 502, and additional first and second bars 504 positioned around a second motor arm, motor, and propeller combination. The second arm 502 and additional first and second bars 504 may form a mirror image to the arm 502 and first and second bars 504 shown in FIG. 5B, such that when the arm 502 and the second arm 502 are both in the extended configuration, two or more propellers are substantially shrouded by the two extended arms 502.

FIGS. 6A and 6B are schematic diagrams of a third adjustable arm shroud 600 in a first configuration and a second configuration, respectively, according to an implementation. The motor arm 106, motor 108, and propeller 110 shown in FIGS. 6A and 6B may be any of the respective combination of components shown in FIG. 1, or any similar combination of a motor arm, motor, and propeller (or other propulsion mechanism) of an aerial vehicle configured differently than that shown in FIG. 1.

The third adjustable arm shroud 600 may include an arm 602 that extends from a fuselage 102 or a wing 104 of the aerial vehicle 100. A first end of the arm 602 may be connected to a slider 606 on the motor arm 106. The slider 606 may be coupled to an actuator 608, e.g., via a slot 607 in the motor arm 106, that moves the slider 606 along a portion of the length of the motor arm 106. A second end of the arm 602 may be connected to a telescoping rod 604, which extends from the fuselage 102 or the wing 104. The arm 602, telescoping rod 604, and slider 606 may be formed of any suitable material, such as metal, plastic, carbon fiber, other materials, flexible or compressible materials, or combinations thereof.

FIG. 6A shows the arm 602 in a retracted or stowed configuration adjacent the fuselage 102 or wing 104 and outside the plane of the propeller 110. In the retracted configuration, the slider 606 is positioned at one end of its travel along the motor arm 106 to move the arm 602 adjacent the fuselage 102 or wing 104 by contracting the telescoping rod 604, thereby eliminating or minimizing adverse aerodynamic effects. The arm 602 may be formed in any shape, e.g., straight, curved, angled, smooth, or otherwise aerodynamically shaped.

FIG. 6B shows the arm 602 in an extended or deployed configuration at least partially around a periphery or perimeter of the propeller 110. In the extended configuration, the slider 606 is positioned at an opposite end of its travel along the motor arm 106, relative to the slider's position in the retracted configuration, to move the arm 602 to the extended position by extending the telescoping rod 604, thereby shrouding the propeller for safety.

In some implementations, the arm 602, the telescoping rod 604, and/or the slider 606 may be retracted into or within the fuselage 102 or the wing 104 in the retracted configuration. For example, the arm 602 may retract into the fuselage 102 and/or form a portion of the outer surface of the fuselage 102 in the retracted configuration. Likewise, the telescoping rod 604 may be situated within the fuselage 102 or the wing 104, such that a portion of the telescoping rod 604 remains connected to and within the fuselage 102 or the wing 104 in the extended configuration.

The slider 606 may be coupled to an actuator 608 via an actuator slot 607 formed in motor arm 106. For example, pins, hooks, rods, or other similar elements of the slider 606 may extend through the actuator slot 607 and couple to the actuator 608. In this manner, the slider 606 may move along a portion of the length of the motor arm 106 via actuation of the actuator 608 and extend or retract the arm 602 by extending or contracting the telescoping rod 604. The actuator 608 may be any suitable actuator configured to move the slider 606 along the motor arm 106, e.g., servo, linear, screw, pneumatic, hydraulic, solenoid, rack and pinion, or other actuator. For example, the actuator 608 may be instructed by an adjustable shroud controller, as described herein, to extend or retract the arm 602. In addition, the slider 606 may be biased, e.g., using a spring or other resilient element, to one end of its travel along the motor arm 106, thereby biasing the arm 602 to one of the retracted configuration adjacent the fuselage 102 or wing 104 or the extended configuration at least partially around the periphery of the propeller 110.

In other implementations, the slider 606 may be actuated using forces generated by movement of the aerial vehicle 100. For example, by causing the aerial vehicle 100 to accelerate, rotate, or spin, the slider 606 may be caused to move along a portion of the length of the motor arm 106 based on the motion of the aerial vehicle 100, thereby moving the arm 602 to one of the extended configuration or the retracted configuration, depending on the orientations of the arm 602, telescoping rod 604, and slider 606.

The actuator slot 607 along which the slider 606 moves may be a straight slot that extends parallel to an axis of the motor arm 106. Alternatively, the actuator slot 607 may extend at an angle to the axis of the motor arm 106 or have any other shape, e.g., curved, arcuate, or angled. The actuator slot 607 may be formed so as to induce a particular movement of the slider 606, and thereby corresponding movements of the telescoping rod 604 and arm 602. For example, if the actuator slot 607 is a straight slot that extends parallel to an axis of the motor arm 106, the arm 602 may move along a flat plane between the retracted and extended configurations. Alternatively, if the actuator slot 607 is curved, arcuate, or angled, the arm 602 may move along an arc or other non-planar shape between the retracted and extended configurations. In this manner, although the arm 602 is located outside the plane of the propeller 110 in the retracted configuration, the arm 602 may move closer to or into the plane of the propeller 110 in the extended configuration.

Although one arm 602, one telescoping rod 604, and one slider 606 are shown in FIGS. 6A and 6B, any number or combination of arms 602, telescoping rods 604, and sliders 606 may be provided in the third adjustable arm shroud 600. For example, two or more arms 602 and two or more telescoping rods 604 may be connected to a single slider 606, such that movement of the slider 606 along a portion of the length of the motor arm 106 causes simultaneous movement of the two or more arms 602 via the two or more telescoping rods 604. Alternatively, two or more sliders 606 may also be provided in the third adjustable arm shroud 600 to independently move two or more arms 602 via two or more telescoping rods 604. In addition, although the telescoping rod 604 is shown in FIGS. 6A and 6B as including five sections 604-1, 604-2, 604-3, 604-4, 604-5, any number of sections may be provided in the telescoping rod 604.

FIGS. 7A and 7B are schematic diagrams of an adjustable leading edge shroud 700 in a first configuration and a second configuration, respectively, according to an implementation. The motor arm 106, motor 108, and propeller 110 shown in FIGS. 7A and 7B may be any of the respective combination of components shown in FIG. 1, or any similar combination of a motor arm, motor, and propeller (or other propulsion mechanism) of an aerial vehicle configured differently than that shown in FIG. 1.

The adjustable leading edge shroud 700 may include a portion of a leading edge 702 of the wing 104 that extends from the wing 104 of the aerial vehicle 100. The portion of the leading edge 702 may be connected to an extension arm 704 that extends within at least one of the wing 104, the motor arm 106, or the boom arm 112. The extension arm 704 may be coupled to an actuator 708, e.g., within at least one of the wing 104, the motor arm 106, or the boom arm 112, that moves the extension arm 704 between the retracted configuration and the extended configuration. The portion of the leading edge 702 and the extension arm 704 may be formed of any suitable material, such as metal, plastic, carbon fiber, other materials, flexible or compressible materials, or combinations thereof.

FIG. 7A shows the portion of the leading edge 702 in a retracted or stowed configuration within a remainder of the wing 104. In the retracted configuration, the extension arm 704 is retracted into at least one of the wing 104, the motor arm 106, or the boom arm 112 to move the portion of the leading edge 702 into the remainder of the wing 104, thereby eliminating or minimizing adverse aerodynamic effects and enabling generally horizontal flight. The portion of the leading edge 702 may be formed in any shape, e.g., straight, curved, angled, smooth, or otherwise aerodynamically shaped.

FIG. 7B shows the portion of the leading edge 702 in an extended or deployed configuration at least partially around a periphery or perimeter of the propeller 110. In the extended configuration, the extension arm 704 is extended from at least one of the wing 104, the motor arm 106, or the boom arm 112 to move the portion of the leading edge 702 to the extended position, thereby shrouding the propeller for safety.

In some implementations, the portion of the leading edge 702 and/or the extension arm 704 may be retracted into or within the wing 104 in the retracted configuration. For example, the portion of the leading edge 702 may retract into the wing 104 and/or form a portion of the outer surface, e.g., a portion of the leading edge, of the wing 104 in the retracted configuration. Likewise, the extension arm 704 may be situated within the wing 104, such that a portion of the extension arm 704 remains connected to and within the wing 104 in the extended configuration.

The extension arm 704 may be coupled to an actuator 708 within at least one of the wing 104, the motor arm 106, or the boom arm 112. In this manner, the extension arm 704 may contract into or extend from the wing 104 to move the portion of the leading edge 702 between the retracted and extended configurations. The actuator 708 may be any suitable actuator configured to move the extension arm 704, e.g., servo, linear, screw, rack-and-pinion, pneumatic, hydraulic, solenoid, or other actuator. For example, the actuator 708 may be instructed by an adjustable shroud controller, as described herein, to extend or retract the portion of the leading edge 702. In addition, the extension arm 704 may be biased, e.g., using a spring or other resilient element, to one end of its travel, thereby biasing the portion of the leading edge 702 to one of the retracted configuration within the remainder of the wing 104 or the extended configuration at least partially around the periphery of the propeller 110.

In other implementations, the extension arm 704 may be actuated using forces generated by movement of the aerial vehicle 100. For example, by causing the aerial vehicle 100 to accelerate, rotate, or spin, the extension arm 704 may be caused to contract into or extend from the wing 104 based on the motion of the aerial vehicle 100, thereby moving the portion of the leading edge 702 to one of the extended configuration or the retracted configuration, depending on the orientations of the portion of the leading edge 702 and the extension arm 704.

Although one portion of the leading edge 702, one extension arm 704, and one actuator 708 are shown in FIGS. 7A and 7B, any number or combination of portions of the leading edge 702, extension arms 704, and actuators 708 may be provided in the adjustable leading edge shroud 700. For example, two or more portions of the leading edge 702 and two or more extension arms 704 may be actuated by a single actuator 708, such that the actuator 708 causes simultaneous movement of the two or more portions of the leading edge 702 via the two or more extension arms 704. Alternatively, two or more actuators 708 may also be provided in the adjustable leading edge shroud 700 to independently move two or more portions of the leading edge 702 via two or more extension arms 704.

Figure 8B:
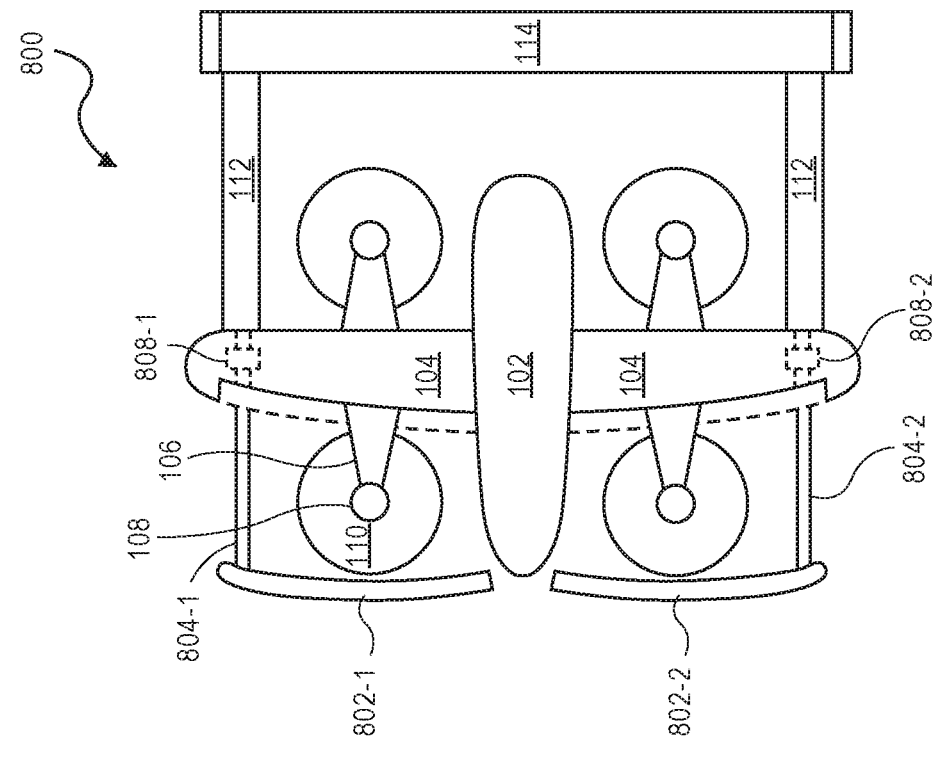
FIG. 8B is a schematic diagram of the adjustable leading edge and tail plane shroud in a second configuration, according to an implementation.
Figure 8A:
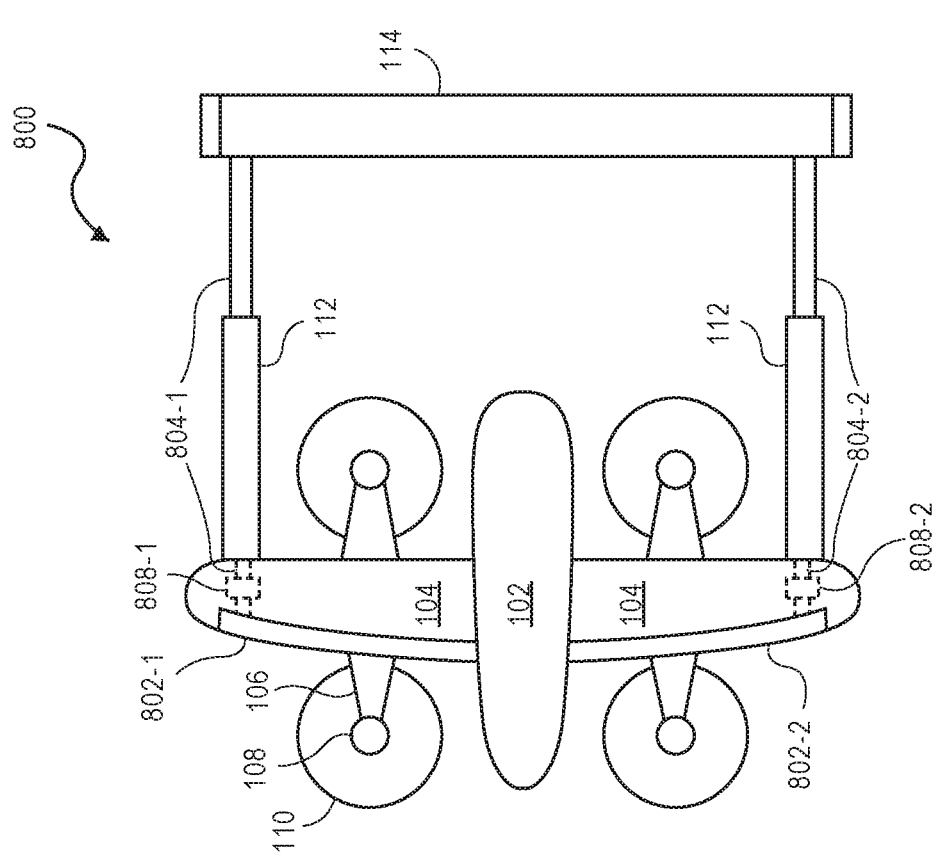
FIG. 8A is a schematic diagram of an adjustable leading edge and tail plane shroud in a first configuration, according to an implementation.

FIGS. 8A and 8B are schematic diagrams of an adjustable leading edge and tail plane shroud 800 in a first configuration and a second configuration, respectively, according to an implementation. Although a particular configuration of an aerial vehicle 100 is shown in FIGS. 8A and 8B, similar to that shown in FIG. 1, the adjustable leading edge and tail plane shroud 800 as described herein may be used with any other configuration of an aerial vehicle including a wing having a leading edge, a tail plane, and at least one propeller, or other propulsion mechanism, that may be selectively shrouded for safety.

The adjustable leading edge and tail plane shroud 800 may include a portion of a leading edge 802 of the wing 104 that extends from the wing 104 of the aerial vehicle 100 as well as a portion of the tail plane 114. The portion of the leading edge 802 may be connected to the portion of the tail plane 114 via an extension arm 804 that extends along and within at least one of the wing 104, the motor arm 106, or the boom arm 112. The extension arm 804 may be coupled to an actuator 808, e.g., within at least one of the wing 104, the motor arm 106, or the boom arm 112, that moves the extension arm 804 between the retracted configuration and the extended configuration. The portion of the leading edge 802, the extension arm 804, and the portion of the tail plane 114 may be formed of any suitable material, such as metal, plastic, carbon fiber, other materials, flexible or compressible materials, or combinations thereof.

FIG. 8A shows the portion of the leading edge 802 in a retracted or stowed configuration within a remainder of the wing 104 to enable generally horizontal flight. In addition, FIG. 8A shows the portion of the tail plane 114 in a retracted configuration to enable generally horizontal flight. In the retracted configuration, the extension arm 804 is retracted rearward into at least one of the wing 104, the motor arm 106, or the boom arm 112 to move the portion of the leading edge 802 into the remainder of the wing 104 and the portion of the tail plane 114 rearward, thereby eliminating or minimizing adverse aerodynamic effects and enabling generally horizontal flight. The portion of the leading edge 802 and the portion of the tail plane 114 may be formed in any shape, e.g., straight, curved, angled, smooth, or otherwise aerodynamically shaped.

FIG. 8B shows the portion of the leading edge 802 in an extended or deployed configuration at least partially around a periphery or perimeter of one or more propellers 110. In addition, FIG. 8B shows the portion of the tail plane 114 in an extended configuration closer to a periphery or perimeter of one or more propellers 110. In the extended configuration, the extension arm 804 is extended forward from at least one of the wing 104, the motor arm 106, or the boom arm 112 to move the portion of the leading edge 802 to the extended position and the portion of the tail plane 114 forward, thereby shrouding one or more propellers for safety.

In some implementations, the portion of the leading edge 802 may be retracted into or within the wing 104 in the retracted configuration. For example, the portion of the leading edge 802 may retract into the wing 104 and/or form a portion of the outer surface, e.g., a portion of the leading edge, of the wing 104 in the retracted configuration.

The extension arm 804 may be coupled to an actuator 808 within at least one of the wing 104, the motor arm 106, or the boom arm 112. In this manner, the extension arm 804 may move forward or rearward relative to the wing 104 to move the portion of the leading edge 702 and the portion of the tail plane 114 between the retracted and extended configurations. The actuator 808 may be any suitable actuator configured to move the extension arm 804, e.g., servo, linear, screw, rack-and-pinion, pneumatic, hydraulic, solenoid, or other actuator. For example, the actuator 808 may be instructed by an adjustable shroud controller, as described herein, to extend or retract the portion of the leading edge 802 and the portion of the tail plane 114. In addition, the extension arm 804 may be biased, e.g., using a spring or other resilient element, to one end of its travel, thereby biasing the portion of the leading edge 802 and the portion of the tail plane 114 to one of the retracted configuration to enable generally horizontal flight or the extended configuration at least partially around the periphery of one or more propellers 110.

In other implementations, the extension arm 804 may be actuated using forces generated by movement of the aerial vehicle 100. For example, by causing the aerial vehicle 100 to accelerate, rotate, or spin, the extension arm 804 may be caused to move forward or rearward relative to the wing 104 based on the motion of the aerial vehicle 100, thereby moving the portion of the leading edge 802 and the portion of the tail plane 114 to one of the extended configuration or the retracted configuration, depending on the orientations of the portion of the leading edge 802, the extension arm 804, and the portion of the tail plane 114.

Although two portions of the leading edge 802-1, 802-2, two extension arms 804-1, 804-2, one portion of the tail plane 114, and two actuators 808-1, 808-2 are shown in FIGS. 8A and 8B, any number or combination of portions of the leading edge 802, extension arms 804, portions of the tail plane 114, and actuators 808 may be provided in the adjustable leading edge and tail plane shroud 800. For example, two or more portions of the leading edge 802 and two or more portions of the tail plane 114 may be actuated by a single actuator 808, such that the actuator 808 causes simultaneous movement of the two or more portions of the leading edge 802 and the two or more portions of the tail plane 114. Alternatively, two or more actuators 808 may also be provided in the adjustable leading edge and tail plane shroud 800 to independently move two or more portions of the leading edge 802 or two or more portions of the tail plane 114, e.g., two portions of the leading edge 802 and two portions of the tail plane 114 may be horizontally symmetrical with respect to a centerline of the aerial vehicle 100 and positioned side-by-side and coplanar with each other in the retracted configuration, such that a first portion of the leading edge 802 moves with a first portion of the tail plane 114, and a second portion of the leading edge 802 moves with a second portion of the tail plane 114.

FIGS. 9A and 9B are schematic diagrams of an adjustable tail plane shroud 900 in a first configuration and a second configuration, respectively, according to an implementation. Although a particular configuration of an aerial vehicle 100 is shown in FIGS. 9A and 9B, similar to that shown in FIG. 1, the adjustable tail plane shroud 900 as described herein may be used with any other configuration of an aerial vehicle including a tail plane, and at least one propeller, or other propulsion mechanism, that may be selectively shrouded for safety.

The adjustable tail plane shroud 900 may include one or more shroud sections 902, which may comprise a portion of the tail plane 114 and a portion of the one or more boom arms 112. The shroud section 902 may be rotatably or pivotably coupled to at least one of the fuselage 102, the wing 104, the one or more motor arms 106, or the one or more boom arms 112. The shroud section 902 may be coupled to an actuator 908, e.g., within at least one of the fuselage 102, the wing 104, the motor arms 106, or the boom arms 112, that moves the shroud section 902 between the retracted configuration and the extended configuration. The shroud section 902 may be formed of any suitable material, such as metal, plastic, carbon fiber, other materials, flexible or compressible materials, or combinations thereof.

FIG. 9A shows the one or more shroud sections 902 in a retracted or stowed configuration positioned in a rearward direction of the aerial vehicle to enable generally horizontal flight. In the retracted configuration, the one or more shroud sections 902 may be stacked on each other, coplanar with each other, coupled to each other, or combinations thereof, thereby eliminating or minimizing adverse aerodynamic effects and enabling generally horizontal flight. In some embodiments, the one or more shroud sections 902 may have the same dimensions such that the one or more shroud sections 902 are stacked on each other in the retracted configuration. In other embodiments, the one or more shroud sections 902 may have different dimensions such that the one or more shroud sections 902 are coplanar with each other in the retracted configuration, e.g., a first shroud section 902-1 having smaller dimensions than a second shroud section 902-2 may be positioned substantially within the smallest dimensions of the second shroud section 902-2 and coplanar thereto. In still other embodiments, the one or more shroud sections 902 may be horizontally symmetrical with respect to a centerline of the aerial vehicle 100 such that the one or more shroud sections 902 are positioned side-by-side and coplanar with each other in the retracted configuration. The one or more shroud sections 902 may be formed in any shape, e.g., straight, curved, angled, smooth, or otherwise aerodynamically shaped.

FIG. 9B shows a first shroud section 902-1 in an extended or deployed configuration at least partially around a periphery or perimeter of one or more propellers 110 in a forward direction of the aerial vehicle. In the extended configuration, the second shroud section 902-2 maintains its position in the rearward direction of the aerial vehicle, and the first shroud section 902-1 is rotated by the actuator 908 toward the forward direction of the aerial vehicle, thereby shrouding one or more propellers for safety.

The first shroud section 902-1 may be coupled to an actuator 908 within at least one of the fuselage 102, the wing 104, the motor arms 106, or the boom arms 112. In this manner, the first shroud section 902-1 may be rotated in a rearward or forward direction of the aerial vehicle between the retracted and extended configurations, respectively. The actuator 908 may be any suitable actuator configured to rotate the first shroud section 902-1, e.g., servo, rotary, screw, rack-and-pinion, pneumatic, hydraulic, solenoid, or other actuator. For example, the actuator 908 may be instructed by an adjustable shroud controller, as described herein, to extend or retract the first shroud section 902-1. In addition, the first shroud section 902-1 may be biased, e.g., using a spring or other resilient element, to one end of its rotational travel, thereby biasing the first shroud section 902-1 to one of the retracted configuration to enable generally horizontal flight or the extended configuration at least partially around the periphery of one or more propellers 110.

In other implementations, the first shroud section 902-1 may be actuated using forces generated by movement of the aerial vehicle 100. For example, by causing the aerial vehicle 100 to accelerate, rotate, or spin, the first shroud section 902-1 may be caused to rotate forward or rearward based on the motion of the aerial vehicle 100, thereby moving the first shroud section 902-1 to one of the extended configuration or the retracted configuration, depending on the orientation of the first shroud section 902-1.

Although two shroud sections 902-1, 902-2 and one actuator 908 are shown in FIGS. 9A and 9B, any number or combination of shroud sections 902 and actuators 908 may be provided in the adjustable tail plane shroud 900. For example, two or more shroud sections 902 may be actuated by a single actuator 908, such that the actuator 908 causes simultaneous movement of the two or more shroud sections 902. Alternatively, two or more actuators 908 may also be provided in the adjustable tail plane shroud 900 to independently move two or more shroud sections 902.

Figure 10:
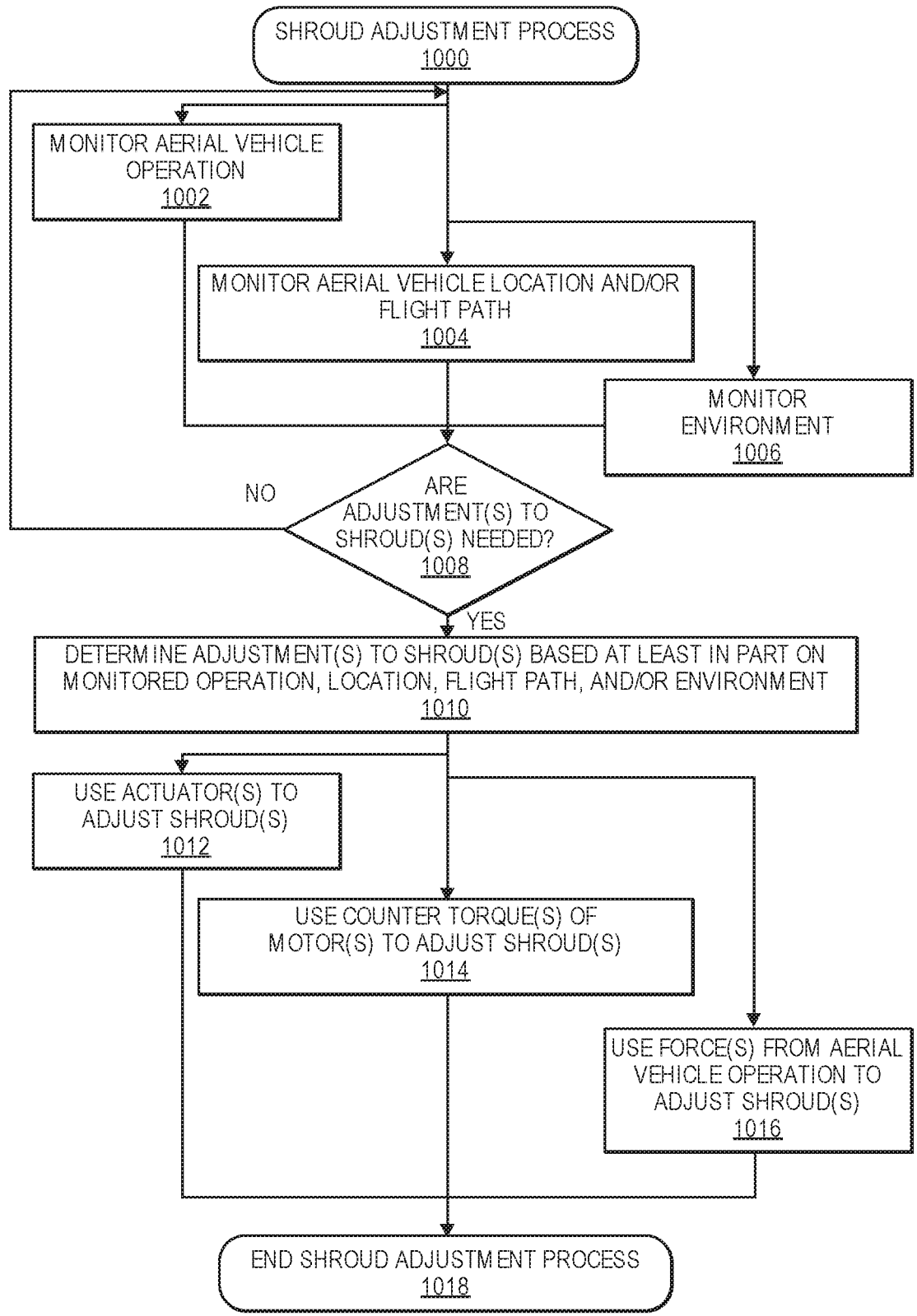
FIG. 10 is a flow diagram illustrating an example shroud adjustment process, according to an implementation.

FIG. 10 is a flow diagram illustrating an example shroud adjustment process 1000, according to an implementation. The process begins at 1000 and proceeds to one or more of the monitoring steps, as in 1002, 1004, and 1006.

At 1002, the operation of the aerial vehicle may be monitored. For example, the aerial vehicle control system 120 may determine that the aerial vehicle is currently in a vertical takeoff and landing (VTOL) operation, a hover operation, a generally horizontal flight operation, a transition operation between any of the above, or any other operation. The operation of the aerial vehicle may be determined from the controllers and/or processors of the aerial vehicle, e.g., the electronic speed control or the navigation system, with reference to data stored within the memory of the aerial vehicle, and/or using one or more of the sensor systems of the aerial vehicle, e.g., image capture devices, time of flight sensors, radar sensors, LIDAR sensors, accelerometers, altitude sensors, pressure sensors, GPS (Global Positioning System) sensors, and/or other sensors.

At 1004, the location and/or flight path of the aerial vehicle may be determined. For example, the aerial vehicle control system 120 may determine that the aerial vehicle is currently located at a payload pickup location, a payload delivery location, a low altitude, a high altitude, an urban area, a suburban area, a rural area, a generally vertical flight portion of the flight path, a generally horizontal flight portion of the flight path, or any other location or portion of the flight path. The location and/or flight path of the aerial vehicle may be determined from the controllers and/or processors of the aerial vehicle, e.g., the electronic speed control or the navigation system, with reference to data stored within the memory of the aerial vehicle, and/or using one or more of the sensor systems of the aerial vehicle, e.g., image capture devices, time of flight sensors, radar sensors, LIDAR sensors, accelerometers, altitude sensors, pressure sensors, GPS (Global Positioning System) sensors, and/or other sensors.

At 1006, the environment of the aerial vehicle may be determined. For example, the aerial vehicle control system 120 may determine that the aerial vehicle is in a congested environment, an open environment, an area with multiple other objects in proximity (e.g., within a determined distance of the aerial vehicle), an area with no objects in proximity (e.g., within a determined distance of the aerial vehicle), an urban environment with large structures, power lines, or other obstacles, a suburban environment with medium-sized structures, power lines, trees, or other obstacles, a rural environment with trees, other natural structures, or other obstacles, an environment with various weather conditions such as wind, rain, snow, sleet, hail, etc., or any other type of environment. The environment of the aerial vehicle may be determined from the controllers and/or processors of the aerial vehicle, e.g., the electronic speed control or the navigation system, with reference to data stored within the memory of the aerial vehicle, and/or using one or more of the sensor systems of the aerial vehicle, e.g., image capture devices, infrared sensors, thermal sensors, time of flight sensors, radar sensors, LIDAR sensors, accelerometers, altitude sensors, pressure sensors, weather sensors, GPS (Global Positioning System) sensors, and/or other sensors.

Continuing with the process 1000, the aerial vehicle control system 120, e.g., the adjustable shroud controller 1112, may then determine whether adjustments to the adjustable shrouds are needed or desired, as in 1008. For example, when transitioning between vertical takeoff and landing and generally horizontal flight, the adjustable shrouds may be adjusted. In addition, when transitioning between a payload pickup or delivery location and a generally horizontal flight portion of the flight path, the adjustable shrouds may be adjusted. Further, when transitioning between a congested environment and an open environment, the adjustable shrouds may be adjusted.

If it is determined at 1008 that adjustments to the adjustable shrouds are not needed or desired, then the process 1000 may return to one or more of 1002, 1004, and 1006 to continue to monitor one or more of the operation, location, flight path, and/or environment of the aerial vehicle.

If, however, it is determined at 1008 that adjustments to the adjustable shrouds are needed or desired, then the aerial vehicle control system 120, e.g., the adjustable shroud controller 1112, may determine the adjustments to be made to the adjustable shrouds, e.g., moved to the extended configuration or to the retracted configuration, based at least in part on the monitored operation, location, flight path, and/or environment of the aerial vehicle, as in 1010. For example, when transitioning from vertical takeoff and landing to generally horizontal flight, the adjustable shrouds may be retracted, and vice versa. In addition, when transitioning from a payload pickup or delivery location to a generally horizontal flight portion of the flight path, the adjustable shrouds may be retracted, and vice versa. Further, when transitioning from a congested environment to an open environment, the adjustable shrouds may be retracted, and vice versa.

After determining the adjustments to be made to the adjustable shrouds, the aerial vehicle control system 120, e.g., the adjustable shroud controller 1112, may instruct or effect such adjustments using one or more methods, as in 1012, 1014, 1016. For example, the aerial vehicle control system 120, e.g., the adjustable shroud controller 1112, may instruct shroud actuators associated with the adjustable shrouds to make the determined adjustments, e.g., retraction or extension of the adjustable shrouds, as in 1012. In addition, the aerial vehicle control system 120, e.g., the adjustable shroud controller 1112, may utilize the counter torques of the motors that rotate the propellers to make the determined adjustments, e.g., retraction or extension of the adjustable shrouds, as in 1014. Further, the aerial vehicle control system 120, e.g., the adjustable shroud controller 1112, may instruct the aerial vehicle to perform an aerial maneuver, e.g., rotation, spin, acceleration, deceleration, or other maneuver, that generates forces to make the determined adjustments, e.g., retraction or extension of the adjustable shrouds, as in 1016.

Following completion of the determined adjustments to the adjustable shrouds, the process 1000 ends at 1018. In addition, the process 1000 may continue to repeat after making the determined adjustments to the adjustable shrouds by returning to the monitoring operations, as in 1002, 1004, 1006, and determining whether subsequent adjustments to the adjustable shrouds are needed or desired based at least in part on the monitored operation, location, flight path, and/or environment. In this manner, the adjustable shrouds may be continuously and selectively moved to one of the retracted configuration or to the extended configuration, in order to selectively shroud one or more propellers for safety as needed or desired, and to selectively eliminate or minimize adverse effects to aerodynamic properties or flight characteristics of the aerial vehicle as needed or desired.

Figure 11:
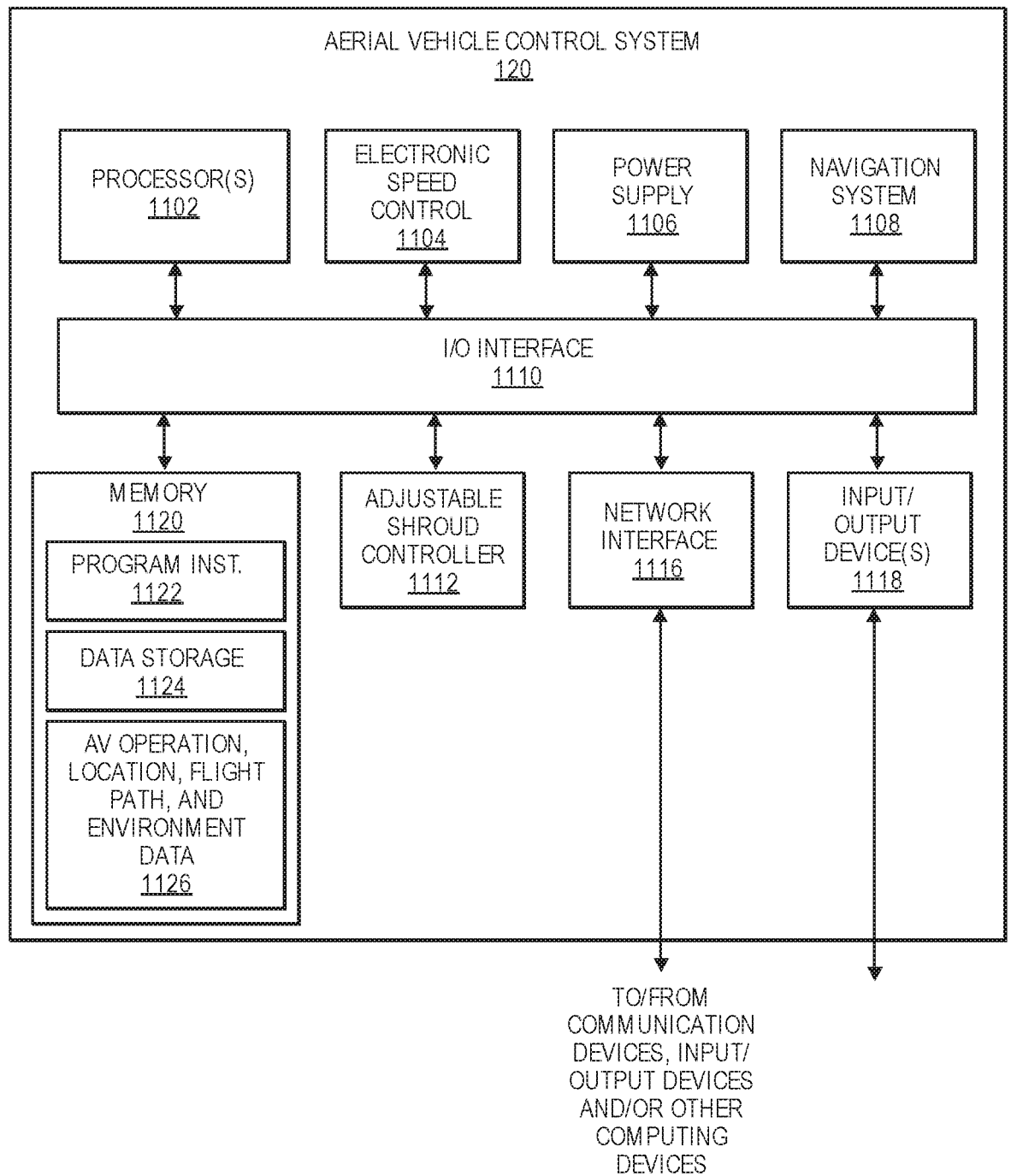
FIG. 11 is a block diagram illustrating various components of an aerial vehicle control system, according to an implementation.

FIG. 11 is a block diagram illustrating various components of an example aerial vehicle control system 120, according to an implementation. In various examples, the block diagram may be illustrative of one or more aspects of the aerial vehicle control system 120 that may be used to implement the various systems and processes discussed above. In the illustrated implementation, the aerial vehicle control system 120 includes one or more processors 1102, coupled to a non-transitory computer readable storage medium 1120 via an input/output (I/O) interface 1110. The aerial vehicle control system 120 may also include an electronic speed control or propulsion controller 1104, a power supply controller/module 1106 and/or a navigation system 1108. The aerial vehicle control system 120 further includes an adjustable shroud controller 1112, a network interface 1116, and one or more input/output devices 1118.

In various implementations, the aerial vehicle control system 120 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, aerial vehicle operation data, aerial vehicle location data, aerial vehicle flight path data, environment data, adjustable shroud data, shroud actuator data, and/or other data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and aerial vehicle operation, location, flight path, and/or environment data 1126, respectively. In other implementations, program instructions, data and/or aerial vehicle data may be received, sent or stored upon different types of computer-accessible media, such as non-transitory media, or on similar media separate from the non-transitory computer readable storage medium 1120 or the aerial vehicle control system 120.

Generally speaking, a non-transitory, computer readable storage medium may include storage media or memory media such as magnetic or optical media, e.g., disk or CD/DVD-ROM, coupled to the aerial vehicle control system 120 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The electronic speed control or propulsion controller 1104 communicates with the navigation system 1108 and adjusts the operational characteristics of each propulsion mechanism to guide the aerial vehicle along a determined flight path and/or to perform other navigational or flight maneuvers. The navigation system 1108 may include a GPS or other similar system than can be used to navigate the aerial vehicle to and/or from a location.

The aerial vehicle control system 120 may also include an adjustable shroud controller 1112. The adjustable shroud controller 1112 may communicate with the controllers and/or processors of the aerial vehicle control system 120, may monitor one or more of the aerial vehicle operation, location, flight path, and/or environment, e.g., using data and information from the controllers, processors, memory, and/or sensor systems of the aerial vehicle, may determine whether adjustments to the adjustable shrouds are needed or desired, may determine the adjustments to be made to the adjustable shrouds, and may instruct or effect such determined adjustments to the adjustable shrouds, e.g., using shroud actuators, using counter torques of motors that rotate the propellers, and/or using forces generated by movement of the aerial vehicle.

The network interface 1116 may be configured to allow data to be exchanged between the aerial vehicle control system 120, other devices attached to a network, such as other computer systems, aerial vehicle control systems of other aerial vehicles, and/or an overall aerial vehicle management system. For example, the network interface 1116 may enable wireless communication between numerous aerial vehicles. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1118 may, in some implementations, include one or more displays, image capture devices, thermal sensors, infrared sensors, time of flight sensors, accelerometers, pressure sensors, weather sensors, other sensors described herein, etc. Multiple input/output devices 1118 may be present and controlled by the aerial vehicle control system 120. One or more of these sensors may be utilized to assist in monitoring at least one of aerial vehicle operation, location, flight path, and/or environment in order to determine whether adjustments to adjustable shrouds are needed or desired.

As shown in FIG. 11, the memory may include program instructions 1122 which may be configured to implement the example processes and/or sub-processes described above. The data storage 1124 and/or aerial vehicle data 1126 may include various data stores for maintaining data items that may be provided for determining aerial vehicle operation, location, flight path, and/or environment, determining adjustable shroud configurations and characteristics, determining needed or desired adjustments to the adjustable shrouds, determining shroud actuator operations and characteristics, determining propeller motor operations and characteristics, determining aerial vehicle aerial maneuvers, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 120 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 120 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 120. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 120 may be transmitted to the aerial vehicle control system 120 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An aerial vehicle, comprising:
a body;
a wing coupled to the body;
a tail plane coupled to the wing via a boom arm;
at least one motor arm coupled to one of the body or the wing;
a motor coupled to the at least one motor arm; and
a propeller coupled to and rotated by the motor;
wherein a leading edge of the wing is configured to selectively move along an axis associated with the boom arm to surround at least a portion of a perimeter of the propeller.

2. The aerial vehicle of claim 1, wherein the boom arm includes a first end and a second end, the first end coupled to the wing; and further comprising:
an extension arm having a third end and a fourth end, the third end coupled to the leading edge of the wing and extending along at least a portion of the boom arm; and
an actuator configured to actuate the extension arm to selectively extend or retract the leading edge of the wing.

3. The aerial vehicle of claim 2, wherein the extension arm extends within the boom arm, and wherein the actuator is located within at least one of the wing or the boom arm.

4. The aerial vehicle of claim 2, wherein the actuator is at least one of a linear actuator, a servo actuator, a pneumatic actuator, a hydraulic actuator, a solenoid, a screw actuator, or a rack and pinion actuator.

5. The aerial vehicle of claim 2, wherein a portion of the tail plane is coupled to the fourth end of the extension arm that extends beyond the second end of the boom arm.

6. The aerial vehicle of claim 5, wherein the actuator is configured to actuate the extension arm to extend the leading edge of the wing and retract the portion of the tail plane toward the wing, and the actuator is configured to actuate the extension arm to retract the leading edge of the wing and extend the portion of the tail plane away from the wing.

7. The aerial vehicle of claim 2, further comprising:
a bias element configured to bias the extension arm toward one of an extended position or a retracted position.

8. The aerial vehicle of claim 1, further comprising:
an actuator configured to selectively move at least one of the leading edge of the wing or a portion of the tail plane; and
a controller in communication with the actuator and configured to at least:
determine at least one of an operation, a location, or an environment associated with the aerial vehicle; and
instruct the actuator to actuate the at least one of the leading edge of the wing or the portion of the tail plane based at least in part on the determined at least one of the operation, the location, or the environment.

9. The aerial vehicle of claim 1, wherein the boom arm includes a first end and a second end, the first end coupled to the wing; and further comprising:
an extension arm having a third end and a fourth end, the third end coupled to the leading edge of the wing and extending along at least a portion of the boom arm;
wherein the extension arm is configured to selectively extend or retract the leading edge of the wing responsive to forces generated by movement of the aerial vehicle.

10. The aerial vehicle of claim 1, wherein the wing includes a plurality of portions of the leading edge that are configured to selectively move to surround at least the portion of the perimeter of the propeller.

11. The aerial vehicle of claim 1, wherein the tail plane includes a plurality of portions of the tail plane that are configured to selectively move to surround at least the portion of the perimeter of the propeller.

12. An automated aerial vehicle, comprising:
a fuselage;
a wing coupled to the fuselage;
a tail plane coupled to the wing via a plurality of boom arms;
a plurality of motor arms, each of the plurality of motors arms coupled to one of the fuselage or the wing;
a plurality of motors, each of the plurality of motors coupled to an end of a respective one of the plurality of motor arms;
a plurality of propellers, each of the plurality of propellers coupled to and rotated by a respective one of the plurality of motors;
a controller in communication with an actuator associated with at least one of the wing or the tail plane and configured to at least:
instruct the actuator to actuate a leading edge of the wing along an axis associated with the plurality of boom arms to selectively surround at least a portion of a perimeter of the plurality of propellers.

13. The automated aerial vehicle of claim 12, wherein instructing the actuator comprises at least one of retracting the leading edge of the wing toward the wing, or extending a portion of the tail plane away from the wing.

14. The automated aerial vehicle of claim 12, wherein instructing the actuator comprises at least one of extending the leading edge of the wing away from the wing, or retracting a portion of the tail plane toward the wing.

15. The automated aerial vehicle of claim 12, wherein the controller is further configured to:
determine at least one of an operation, a location, or an environment associated with the automated aerial vehicle;
wherein the controller is further configured to instruct the actuator based at least in part on the determined at least one of the operation, the location, or the environment; and
wherein determining the at least one of the operation, the location, or the environment associated with the automated aerial vehicle comprises at least one of identifying a transition between vertical flight and horizontal flight, identifying the location as a delivery location, or identifying an object in the environment within a determined distance of the automated aerial vehicle.

\* \* \* \* \*